United States Patent
Aoki et al.

(10) Patent No.: US 10,686,881 B2
(45) Date of Patent: Jun. 16, 2020

(54) TRANSMISSION SYSTEM, TRANSMISSION DEVICE, AND DATA TRANSMISSION METHOD

(71) Applicant: Seiko Epson Corporation, Tokyo (JP)

(72) Inventors: Shigeru Aoki, Shiojiri (JP); Naohiro Kaneko, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 324 days.

(21) Appl. No.: 14/914,080

(22) PCT Filed: Aug. 22, 2014

(86) PCT No.: PCT/JP2014/004340
§ 371 (c)(1),
(2) Date: Feb. 24, 2016

(87) PCT Pub. No.: WO2015/029406
PCT Pub. Date: Mar. 5, 2015

(65) Prior Publication Data
US 2016/0212213 A1    Jul. 21, 2016

(30) Foreign Application Priority Data

Aug. 29, 2013  (JP) .................................. 2013-178387
Aug. 29, 2013  (JP) .................................. 2013-178388
Aug. 29, 2013  (JP) .................................. 2013-178523

(51) Int. Cl.
*G06F 11/00* (2006.01)
*H04L 29/08* (2006.01)
(Continued)

(52) U.S. Cl.
CPC ...... *H04L 67/1097* (2013.01); *G06F 11/1402* (2013.01); *G06F 13/4027* (2013.01)

(58) Field of Classification Search
CPC ...... G06Q 20/20; G06Q 20/202; G06Q 20/32; G06Q 20/327; G06Q 30/0268; G06F 3/1234; G06F 3/1285
See application file for complete search history.

(56) References Cited

U.S. PATENT DOCUMENTS 5,233,341 A * 8/1993 Duthoit ................. G08C 25/02
                                                   340/3.51
6,199,179 B1 * 3/2001 Kauffman ............ G06F 9/5077
                                                   714/11
(Continued)

FOREIGN PATENT DOCUMENTS

JP    11-232055 A    8/1999
JP    11-316658 A   11/1999
(Continued)

OTHER PUBLICATIONS

Extended European Search Report dated Feb. 15, 2017 in related European Appl. 14839936.3 (7 pgs.).

*Primary Examiner* — Loan L. T. Truong
(74) *Attorney, Agent, or Firm* — Foley & Lardner LLP

(57) ABSTRACT

The relationship between sending device and receiving device is controlled with a high degree of freedom when sending and receiving data between multiple devices.
A POS system has a second tablet terminal that receives data, and a host device. The host device has a server interface that sends data to the second tablet terminal; a storage unit that includes a transmission buffer for storing data and stores buffer link information relating the transmission buffer to the second tablet terminal to which the data is sent; and a communication unit 2 that acquires data and control storing the data to the transmission buffer. When the communication unit stores the data to the transmission buffer, the stored data is sent to the second tablet terminal.

20 Claims, 9 Drawing Sheets

(51) Int. Cl.
*G06F 13/40* (2006.01)
*G06F 11/14* (2006.01)

(56) References Cited

U.S. PATENT DOCUMENTS

| | | | | |
|---|---|---|---|---|
| 6,243,689 | B1* | 6/2001 | Norton | G06Q 20/04 |
| | | | | 705/18 |
| 8,010,753 | B2* | 8/2011 | Zohar | G06F 3/0613 |
| | | | | 711/153 |
| 8,441,666 | B2* | 5/2013 | Tomii | G06F 3/121 |
| | | | | 358/1.1 |
| 8,645,213 | B2* | 2/2014 | Granbery | G06Q 20/10 |
| | | | | 705/16 |
| 9,319,353 | B2* | 4/2016 | Liang | H04L 49/90 |
| 10,074,082 | B2* | 9/2018 | Argue | G07G 1/0081 |
| 10,078,829 | B2* | 9/2018 | Sugiyama | G06Q 20/209 |
| 10,255,645 | B1* | 4/2019 | Christensen | G06Q 50/16 |
| 10,282,724 | B2* | 5/2019 | Hammad | G06Q 20/3227 |
| 2001/0021197 | A1* | 9/2001 | Foore | H04J 3/1682 |
| | | | | 370/468 |
| 2002/0026426 | A1* | 2/2002 | Bennett | G06F 17/30861 |
| | | | | 705/64 |
| 2002/0098027 | A1* | 7/2002 | Koike | G06F 13/126 |
| | | | | 400/62 |
| 2002/0099915 | A1* | 7/2002 | Takada | H04L 12/5601 |
| | | | | 711/154 |
| 2003/0061100 | A1* | 3/2003 | Minowa | G06Q 30/02 |
| | | | | 705/14.65 |
| 2003/0157955 | A1* | 8/2003 | Jarvisalo | H04B 17/102 |
| | | | | 455/522 |
| 2004/0047367 | A1* | 3/2004 | Mammen | H04J 3/0623 |
| | | | | 370/472 |
| 2004/0184430 | A1* | 9/2004 | Jones | H04L 1/1685 |
| | | | | 370/346 |
| 2004/0220876 | A1* | 11/2004 | Liu | G06Q 20/40 |
| | | | | 705/44 |
| 2004/0248548 | A1* | 12/2004 | Niwa | G06Q 20/00 |
| | | | | 455/407 |
| 2004/0249718 | A1* | 12/2004 | Kuroda | G06Q 20/204 |
| | | | | 705/17 |
| 2005/0211773 | A1* | 9/2005 | Nobutani | G06Q 20/20 |
| | | | | 235/383 |
| 2006/0149995 | A1* | 7/2006 | Kondajeri | G06F 11/0712 |
| | | | | 714/5.11 |
| 2006/0164989 | A1* | 7/2006 | Hart | H04L 43/0894 |
| | | | | 370/235 |
| 2006/0215678 | A1 | 9/2006 | Aoki | |
| 2006/0229984 | A1* | 10/2006 | Miyuki | G06Q 20/102 |
| | | | | 705/40 |
| 2006/0265517 | A1 | 11/2006 | Hashimoto et al. | |
| 2007/0208876 | A1* | 9/2007 | Davis | H04L 12/4645 |
| | | | | 709/240 |
| 2007/0273923 | A1 | 11/2007 | Kimura | |
| 2007/0286217 | A1* | 12/2007 | Miyata | H04L 12/5692 |
| | | | | 370/401 |
| 2008/0002707 | A1* | 1/2008 | Davis | H04L 12/4645 |
| | | | | 370/392 |
| 2008/0072113 | A1* | 3/2008 | Tsang | H04L 1/1874 |
| | | | | 714/748 |
| 2008/0082988 | A1* | 4/2008 | Chow | G06F 15/163 |
| | | | | 719/313 |
| 2008/0101396 | A1* | 5/2008 | Miyata | H04L 12/66 |
| | | | | 370/408 |
| 2008/0133374 | A1 | 6/2008 | Nobutani | |
| 2008/0170571 | A1* | 7/2008 | Kumar | H04L 49/3072 |
| | | | | 370/392 |
| 2008/0266601 | A1 | 10/2008 | Narukawa et al. | |
| 2009/0063786 | A1* | 3/2009 | Oh | G06F 11/1068 |
| | | | | 711/148 |
| 2009/0259786 | A1 | 10/2009 | Lin et al. | |
| 2009/0260045 | A1* | 10/2009 | Karlsson | H04N 21/2187 |
| | | | | 725/93 |
| 2009/0265475 | A1* | 10/2009 | Fujita | H04L 45/20 |
| | | | | 709/231 |
| 2009/0283592 | A1* | 11/2009 | Yamane | A47F 9/04 |
| | | | | 235/383 |
| 2009/0292373 | A1* | 11/2009 | Miyata | G05B 19/042 |
| | | | | 700/1 |
| 2009/0303998 | A1* | 12/2009 | Rao | H04L 1/1685 |
| | | | | 370/392 |
| 2009/0307557 | A1* | 12/2009 | Rao | H04L 1/1874 |
| | | | | 714/749 |
| 2012/0093024 | A1* | 4/2012 | Kilian | H04L 12/403 |
| | | | | 370/252 |
| 2012/0133974 | A1 | 5/2012 | Nakamura | |
| 2012/0173396 | A1* | 7/2012 | Melby | G06Q 20/102 |
| | | | | 705/34 |
| 2013/0039390 | A1* | 2/2013 | Vallette | H04B 1/7115 |
| | | | | 375/148 |
| 2013/0073919 | A1* | 3/2013 | Sano | H04L 1/1803 |
| | | | | 714/748 |
| 2013/0176988 | A1* | 7/2013 | Wang | H04W 28/08 |
| | | | | 370/331 |
| 2013/0232017 | A1* | 9/2013 | Nathanel | G06Q 20/20 |
| | | | | 705/16 |
| 2013/0246258 | A1* | 9/2013 | Dessert | G06Q 20/40 |
| | | | | 705/41 |
| 2013/0262783 | A1* | 10/2013 | Okada | G06F 9/546 |
| | | | | 711/147 |
| 2013/0332294 | A1* | 12/2013 | Mooring, II | G06Q 20/322 |
| | | | | 705/21 |
| 2014/0024395 | A1* | 1/2014 | Johnson | H04W 4/02 |
| | | | | 455/456.3 |
| 2014/0074691 | A1* | 3/2014 | Bank | G06Q 20/3278 |
| | | | | 705/39 |
| 2014/0092415 | A1* | 4/2014 | Yokoyama | G06F 3/1298 |
| | | | | 358/1.13 |
| 2014/0100931 | A1* | 4/2014 | Sanchez | G06Q 20/40 |
| | | | | 705/14.23 |
| 2014/0126363 | A1* | 5/2014 | Zeng | H04W 28/0205 |
| | | | | 370/230 |
| 2014/0156517 | A1* | 6/2014 | Argue | G07G 1/0081 |
| | | | | 705/40 |
| 2014/0164234 | A1* | 6/2014 | Coffman | G06Q 20/14 |
| | | | | 705/40 |
| 2014/0222663 | A1* | 8/2014 | Park | G06Q 20/29 |
| | | | | 705/39 |
| 2014/0330654 | A1* | 11/2014 | Turney | G06Q 20/14 |
| | | | | 705/15 |
| 2014/0351118 | A1* | 11/2014 | Zhao | G06Q 20/3224 |
| | | | | 705/40 |
| 2014/0351366 | A1* | 11/2014 | Maeda | H04L 67/1097 |
| | | | | 709/215 |
| 2014/0372656 | A1* | 12/2014 | Sakurai | G06T 1/20 |
| | | | | 710/310 |
| 2015/0032567 | A1* | 1/2015 | Bhatia | G06Q 30/06 |
| | | | | 705/26.8 |
| 2015/0180805 | A1* | 6/2015 | Yoshida | H04L 47/34 |
| | | | | 370/421 |
| 2015/0365272 | A1* | 12/2015 | Takasu | G06Q 20/202 |
| | | | | 709/223 |
| 2016/0092323 | A1* | 3/2016 | Moscovici | G06F 11/2023 |
| | | | | 714/4.12 |
| 2017/0083878 | A1* | 3/2017 | Conrad | G06Q 50/26 |
| 2017/0279903 | A1* | 9/2017 | Mimassi | H04L 67/18 |

FOREIGN PATENT DOCUMENTS

| | | |
|---|---|---|
| JP | 2001-109448 A | 4/2001 |
| JP | 2006-270469 A | 10/2006 |
| JP | 2007-108868 A | 4/2007 |
| JP | 2007-317088 A | 12/2007 |
| JP | 2009-129157 A | 6/2009 |
| JP | 2010-049534 A | 3/2010 |
| JP | 2011-034506 A | 2/2011 |
| JP | 2012-118733 A | 6/2012 |
| JP | 2012-182744 A | 9/2012 |

(56) References Cited

FOREIGN PATENT DOCUMENTS

| JP | 2012-194640 A | 10/2012 |
|----|---------------|---------|
| JP | 2012-226471 A | 11/2012 |
| JP | 2013-061982 A | 4/2013  |

* cited by examiner

FIG. 7
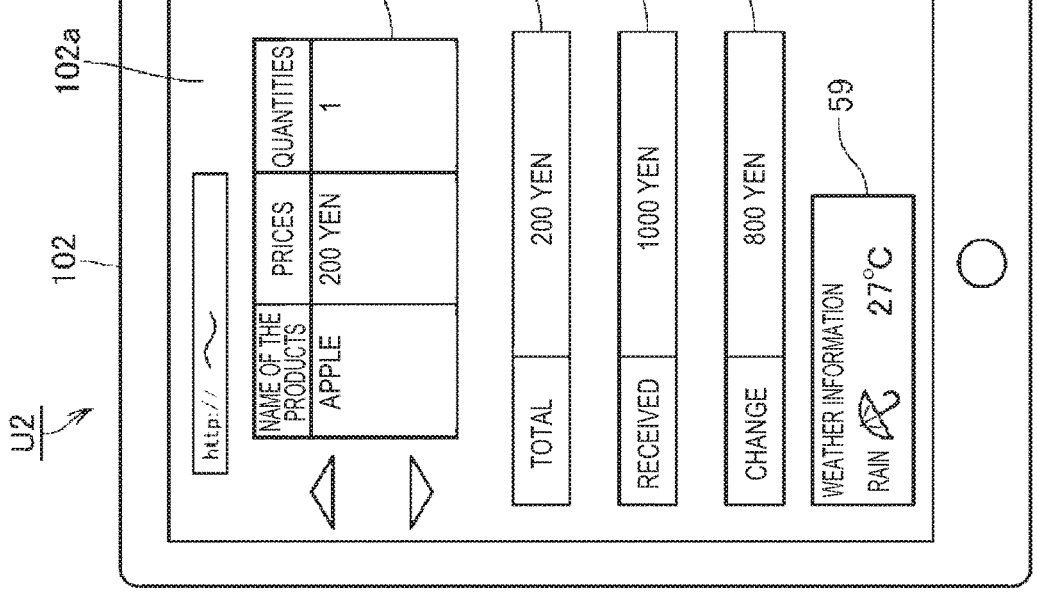
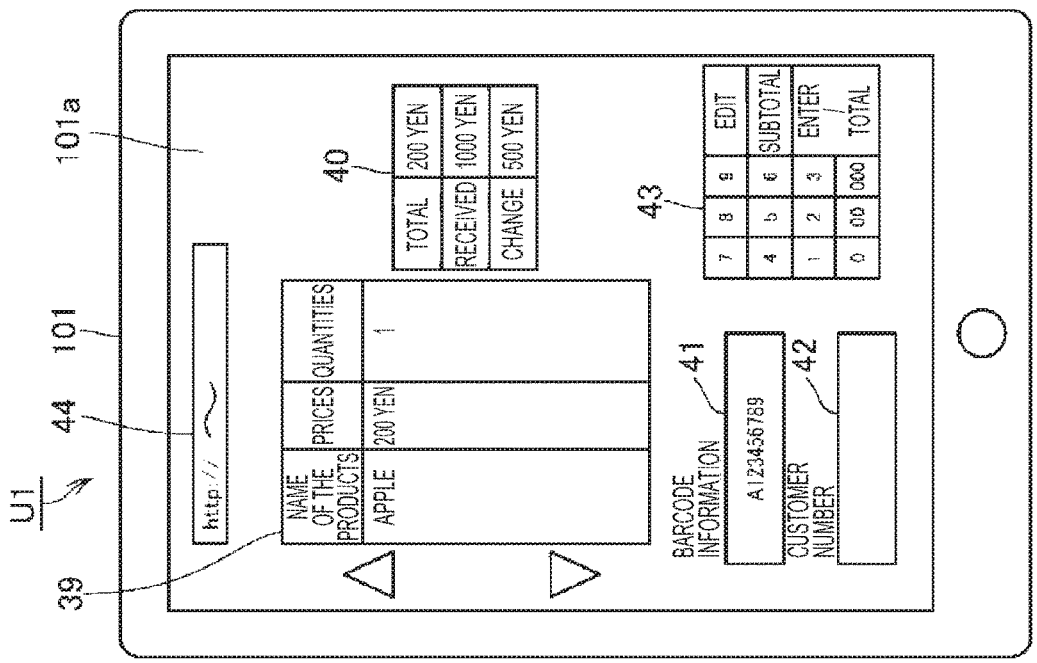

TRANSMISSION SYSTEM, TRANSMISSION DEVICE, AND DATA TRANSMISSION METHOD

TECHNICAL FIELD

The present invention relates to a transmission system, a transmission device, and a data transmission method.

BACKGROUND

Methods of two-way communication using the Web-Socket standard as a means of exchanging data between a plurality of devices are known from the literature (see, for example, PTL 1). Each time data is stored in the storage unit of the server in the configuration disclosed in PTL 1, data is sent from the server to a client device. This configuration enables transmitting data while omitting the process of the client device requesting data from the server.

POS systems used for processing transactions related to product sales that are configured so that price, quantity, and other information is output by a device other than the POS terminal device used by the operator are also known from the literature (see, for example, PTL 1). A POS customer display that is connected to a host device and displays information according to commands input from the host device is described in PTL 2. Output devices such as customer displays used in POS systems must be able to output information in real-time without creating a significant delay when the transaction process is run by the POS system. As a result, the customer display is conventionally connected directly to the host device as described in PTL 1, and commands are sent as necessary from the host device to control the display.

CITATION LIST

Patent Literature

[PTL 1] JP-A-2012-182744
[PTL 2] JP-A-2001-109448

SUMMARY OF INVENTION

Technical Problem

When transmitting data without the device on the side that receives the data requesting the data, which device the data should be sent to cannot be determined because the receiving side does not request the data. As a result, this requires a simple connection, such as a 1:1 connection between the device on the transmitting side and the device on the receiving side, as described in PTL 1, for example. Furthermore, because the process of the receiving device requesting data is omitted, retransmission is difficult when receiving the data fails, for example.

Therefore, with consideration for this problem, an objective of the present invention is to enable controlling the relationship between the transmitting device and the receiving device with a high degree of freedom when sending and receiving data between devices.

A further objective of the invention is to enable sending data between multiple devices while also enabling controlling retransmission of data.

A POS system such as described above may also have multiple customer displays or other output devices. In this case, individually controlling each of the output devices was difficult. For example, there are no examples of control enabling using multiple customer displays to display content in different ways.

A further objective of the invention is to enable individually controlling the operation of output devices in a POS system.

Solution to Problem

To achieve the above objective, a transmission system according to the invention includes: a reception device that receives data; and a transmission device including a transmission unit that sends the data to the reception device, a storage unit having a storage area to store data and storing relation information linking the storage area to a reception device, and a storage control unit that controls storing the data to the storage area; wherein the transmission device sends the data stored in the storage area by the storage control unit to the reception device.

Thus comprised, when the transmission device acquires new data, the data is sent to the related reception device without the reception device that that is to receive the data requesting the transmission device to send the data. The reception device to which to send the data can be determined at this time with a high degree of freedom.

In the foregoing transmission system, the transmission device may include a transmission control unit that, when the storage control unit stores the data to the storage area, sends the data stored in the storage area to the reception device linked by the relation information to the storage area.

Thus comprised, when the transmission device acquires new data, the data can be sent to the related reception device by control of the transmission device without the reception device that that is to receive the data requesting the transmission device to send the data.

The foregoing transmission system preferably also has a second reception device that receives second data; wherein the storage unit has a second storage area different from the storage area; the relation information links the second storage area and the second reception device; and when the storage control unit stores the second data in the second storage unit, the transmission control unit controls the transmission unit to send the second data stored in the second storage unit to the second reception device linked by the relation information to the second storage area.

Thus comprised, the storage unit has a storage area and a second storage area, the storage area and reception device are linked, and the second storage area and the second reception device are linked, by the relation information, and data stored in the second storage area is sent to the second reception device. The reception device to which the data is sent can therefore be determined freely by linking the plural storage areas with the plural reception devices by the relation information.

The foregoing transmission system preferably also has a data supply device that supplies the data to the transmission device. The data includes information specifying the storage area; and when controlling storing the data in the storage device, the storage control unit stores the data in the storage area based on the information specifying the storage area contained in the data.

Thus comprised, the data the transmission device acquires from the data supply device contains information specifying a storage area, and this data is store in the specified storage area and is sent to the reception device linked to the storage area storing the data. As a result, data acquired from a data supply device can be sent to the desired reception device. In addition, the reception device to which to send data can be specified by the data the data supply device supplies.

The foregoing transmission system preferably also has a data supply device that supplies data to the transmission device. The data has attribute information; and when controlling storing the data in the storage area, the storage control unit stores the data in the storage area based on the attribute information contained in the data.

Thus comprised, the data the transmission device acquires from the data supply device is stored to a storage area corresponding to attributes of the data, and is sent to the reception device linked to the storage area storing the data. As a result, data acquired from a data supply device can be quickly sent to the desired reception device. In addition, the reception device to which to send data supplied by the data supply device can be determined from the attributes of the supplied data.

In the foregoing transmission system, the reception device and the transmission device may connect by WebSocket; and the transmission device has a link information control unit that generates the relation information linking a connected reception device to the storage area.

Thus comprised, the reception device to which data is sent is connected to the transmission device by WebSocket, the connected reception device is related to a particular storage area, and the transmission device can use this relationship to determine the reception device to which to send the acquired data.

In the foregoing transmission system, when the reception device requests retransmission of data after data stored in the storage area of the transmission data is sent to the reception device, the data stored in the storage area may be resent to the reception device.

Thus comprised, data can be sent from the transmission device to the reception device without going through a process of the reception device requesting the transmission device to send data, and when the reception device requests retransmission of data, data is resent from the transmission device to the reception device. As a result, data can be sent to the reception device, and data can be retransmitted in response to a request from the reception device.

In the transmission system described above, when the transmission device sends the data stored by the storage control unit in the storage area to the reception device linked to the storage area by the relation information and the reception device then requests retransmission of the data, the transmission control unit may control the transmission unit to resend the data stored in the storage area linked to the reception device by the relation information.

Thus comprised, data can be sent from the transmission device to the reception device as controlled by the transmission device without going through a process of the reception device requesting the transmission device to send data. In addition, when the reception device requests the transmission device to resend data, data stored in the storage area linked to the reception device that requested retransmission is resent to the reception device as controlled by the transmission device. As a result, data can be sent to the reception device, and data can resent in response to a request from the reception device, Further preferably in the foregoing transmission system, the reception device and the transmission device are connected by WebSocket; and the transmission control unit controls the transmission unit to push the data to the reception device.

Thus comprised, when the transmission device stores data in the storage area, the data is pushed to the reception device and data can be resent as needed.

In the foregoing transmission system, the storage area is preferably a storage area with a predetermined storage capacity, and stores second data different from the data; and the storage control unit additionally stores the second data when the total of the amount of the data and the amount of the second data is less than or equal to the capacity of the storage area, and stores the data by overwriting when the total of the amount of the data and the amount of the second data exceeds the capacity of the storage area.

Thus comprised, because data is accumulated to the storage capacity of a predetermined storage area, more data can be resent to the reception device when the reception device requests retransmission of data.

A transmission system according to another aspect of the invention is a POS system including a POS terminal device that runs a transaction process; the reception device is an output device that outputs based on data; and the transmission device is a server device including a transmission unit that sends the data to the output device, a storage unit having storage areas to store data and storing relation information linking the storage areas to the output devices, a storage control unit that acquires and stores the data in the storage area based on a transaction process of the POS terminal device, and a transmission control unit that, when the storage control unit stores the data to the storage area, sends the data stored in the storage area to the output device linked by the relation information to the storage area.

Thus comprised, data based on a transaction process run by the POS terminal is transmitted from the server to the output device without going through a process of the output device requesting the server for data. The output device to which data is sent can also be set based on the relationship to the storage area. As a result, the data to output to the output device, and the output device to which the data should be sent, can be determined as desired, and output devices can be individually controlled.

The transmission system may be configured with the output device and the server device connecting by WebSocket; and the server device having a link information control unit that generates the relation information linking a connected output device to the storage area.

Thus comprised, because an output device connected by WebSocket to the server is linked to a storage area as the data output destination by the relation information, the server can send data to the output device according to the relation information.

Further preferably, the transmission system has an input device that sends input data to the POS terminal device, and the data may be the input data sent by the input device, or transaction data resulting from executing a transaction process based on the input data.

Thus comprised, input data the input device sent to the POS terminal, or transaction data resulting from a transaction process, is sent to the output device related to the storage area. As a result, when input data or transaction data is output to an output device, the data to output and the output device to output to can be determined as desired.

In another example of the transmission system, the storage unit has plural storage areas, the data has identification information that specifies a particular storage area, and the storage control unit stores to the storage areas based on the identification information.

Thus comprised, by specifying a storage area with the identification information in the data acquired by the server, the output device to which to output the data can be determined, and data can be sent to a desired output device.

In a transmission system according to another aspect of the invention, the storage unit has multiple storage areas; the data has attribute information; and the storage control unit selects a storage area to store the data based on the attribute information.

Thus comprised, data acquired by a server is stored to the storage area related to the attribute information in the data, and is sent to the output device linked to that storage area. As a result, because data is sent to the output device corresponding to the data attributes, data can be sent to a desired output device.

In a transmission system according to another aspect of the invention, the output device is a display device having a display unit that displays, and an output control unit that displays on the display unit based on the data; the relation information includes information related to a display format of the output device; and the output control unit displays the data on the display unit based on information in the relation information related to the display format.

Thus comprised, the output device can display received data, and the display format of the data can be controlled using the relation information stored by the server. As a result, data can be sent from the server to an output device, and displayed in a desired display format.

To achieve the foregoing objective, a transmission device according to another aspect of the invention includes a transmission unit that transmits data; a storage unit having storage areas to store data and storing relation information linking a storage area to a reception device; a storage control unit that controls storing the data to the storage areas; and a transmission control unit that, when the storage control unit stores the data to the storage area, sends the data stored in the storage area to the reception device linked by the relation information to the storage area.

Thus comprised, when the transmission device acquires new data, the data can be sent to the related reception device without the reception device that that is to receive the data requesting the transmission device to send the data. The reception device to which to send the data can be determined at this time with a high degree of freedom.

Further preferably in this transmission device, when the transmission control unit controls the transmission unit to send the data stored in the storage area to the reception device linked to the storage area by the relation information and the reception device then requests retransmission of the data, the transmission control unit resends the data stored in the storage area linked to the reception device.

Thus comprised, data can be sent from the transmission device to the reception device without going through a process of the reception device requesting the transmission device to send data. When the reception device requests retransmission of data from the transmission device, data stored in the storage area linked to the reception device that request retransmission is resent from the transmission device. As a result, data can be sent to the reception device, and data can be retransmitted in response to a request from the reception device.

In another aspect of the invention, the transmission device is configured as a server device that transmits data to an output device by the transmission unit; the storage unit has a plurality of storage areas that store the data, and stores relation information linking the storage areas to the output devices; the storage control unit acquires and stores the data in the storage areas; and the transmission control unit controls the transmission unit, and when the storage control unit stores the data in the storage area, the transmission control unit controls the transmission unit to send the data stored in the storage area to the output device linked to the storage area by the relation information.

Thus comprised, data is sent to the output device linked to a storage area of the server without going through a process of the output device requesting the server for data. Because the output device to which data is sent can be determined by the relationship to the storage area, the data output to the output device, and the output device to which the data is sent, can be determined as desired, and the output devices can be individually controlled.

Another aspect of the invention is a data transmission method, including: acquiring data including information specifying a storage area; storing the data in the storage area based on the information specifying a storage area; and sending data stored in the storage area to the reception device linked to the storage area when data is stored in the storage area.

Thus comprised, data can be acquired, the data stored in a storage area based on information contained in the acquired data, and the data sent to the reception device related to the storage area. As a result, when the transmission device acquires new data, the data can be sent to the reception device related to the data without the reception device that that is to receive the data requesting the transmission device to send the data. The reception device to which to send the data can also be determined at this time with a high degree of freedom.

Further preferably, the data transmission method is a method of sending the data from a transmission device that transmits the data to a plurality of reception devices; a plurality of storage areas that store data are disposed in the transmission device; and the transmission device stores the data in the storage area, sends the data stored in the storage area to the reception device linked to the storage area, and sends the data stored in the storage area linked to the reception device when the reception device requests retransmission of the data after the transmission device has transmitted the data to the reception device.

Thus comprised, the transmission device can quickly send data to the reception device without the reception device that is to receive the data requesting the transmission device to send data. When retransmission of data is requested from the transmission device by the reception device, data related to the reception device that requested retransmission is resent. As a result, data can be retransmitted.

Further preferably, the data transmission method includes acquiring the data based on a transaction process of the POS terminal device; storing the acquired data in the storage area; and when the data is stored to the storage area, sending the data to the output device linked to the storage area.

Thus comprised, when the server device acquired data based on operation of the POS terminal, data is sent to an output device without going the process of the output device requesting the server for data. The output device to which data is sent can also be determined by the relationship to the storage area. As a result, the data output to individual output devices can be determined as desired, and the output devices can be individually controlled.

As described above, the reception device to which data is sent when the transmission device sends acquired data to a reception device can be determined with a high degree of freedom.

Furthermore, the transmission device can quickly send acquired data to the reception device, and data can be resent when retransmission of data is requested by the reception device.

In a POS system, the data output to individual output devices can also be freely determined, and the output devices can be individually controlled.

BRIEF DESCRIPTION OF DRAWINGS

FIG. 7 shows an example of a user interface presented on a tablet terminal.

DESCRIPTION OF EMBODIMENTS

A preferred embodiment of the invention is described below with reference to the accompanying figures.

Figure 1:
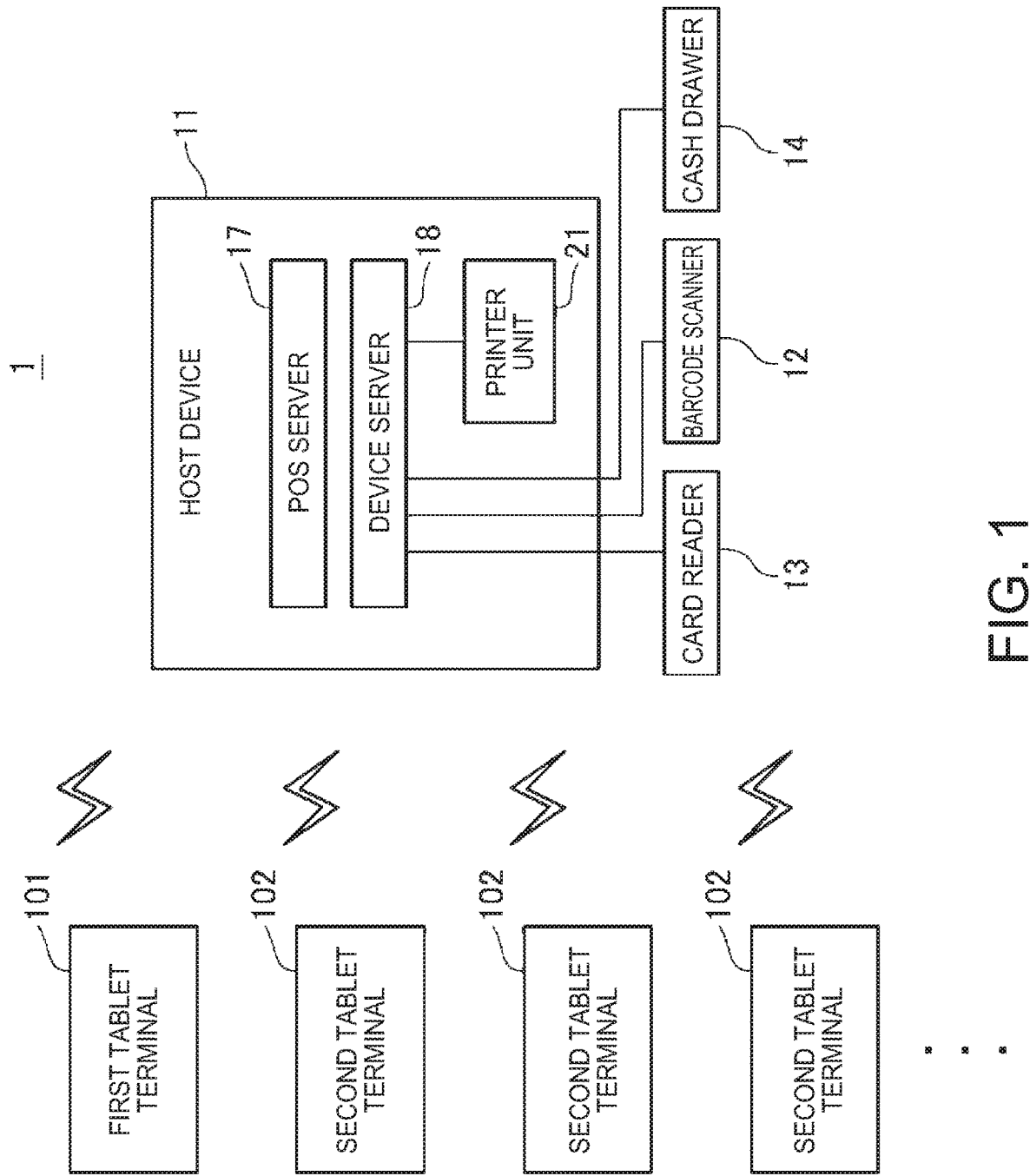
FIG. 1 is a block diagram showing an example of the configuration of a POS system according to a preferred embodiment of the invention.
Figure 2:
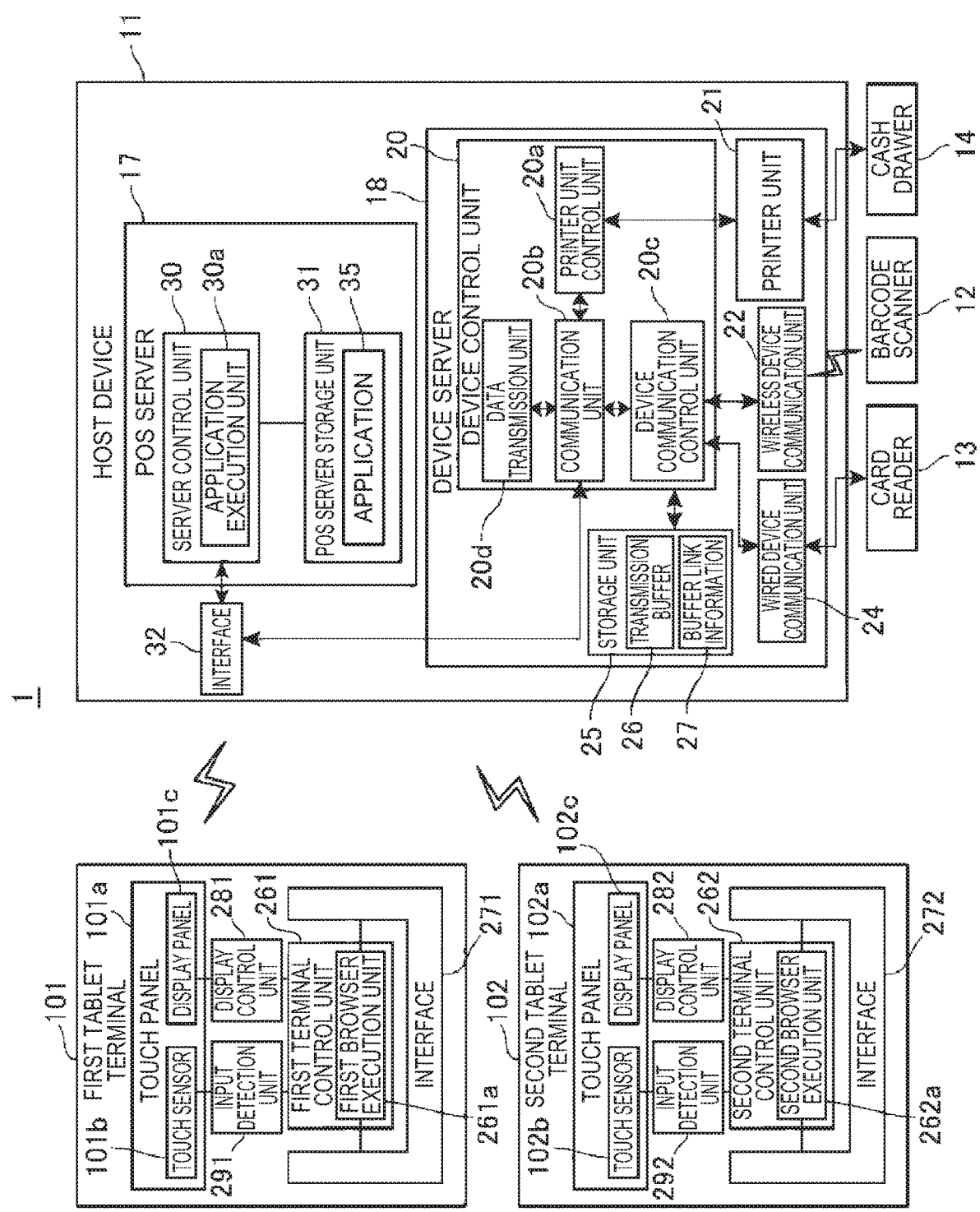
FIG. 2 is a block diagram showing the functional configuration of devices in the POS system.

FIG. 1 is a block diagram illustrating the basic configuration of a POS (Point of Sales) system 1 (transmission system) according to this embodiment of the invention. FIG. 2 is a block diagram illustrating the functional configuration of a first tablet terminal 101 (data supply device), a second tablet terminal 102 (reception device, output device), and a host device 11 (transmission device, server device) in the POS system 1.

The POS system 1 is a system that is employed in shopping centers, department stores, convenience stores, and other types of retail stores, restaurants, coffee shops, and other food service providers, and other types of stores and businesses. The POS system 1 handles registering product sales, calculating payment amounts, transaction processing related to payments, producing receipts showing the results of sale and transaction processes providing information related to the transaction process, and other operations relating to product sales in the business. The POS system 1 also has functions for managing product marketing, product inventory, and sales trends, for example, in the business.

There are plural checkout counters where transactions are processed in a store where the POS system 1 is used. At least one host device 11 and multiple second tablet terminals 102 can be disposed at one checkout counter. One of the second tablet terminals 102 corresponds to a reception device, and another second tablet 102 corresponds to a second reception device. The first tablet terminal 101 and one or plural second tablet terminals 102 are connected to the host device 11.

Figure 5:
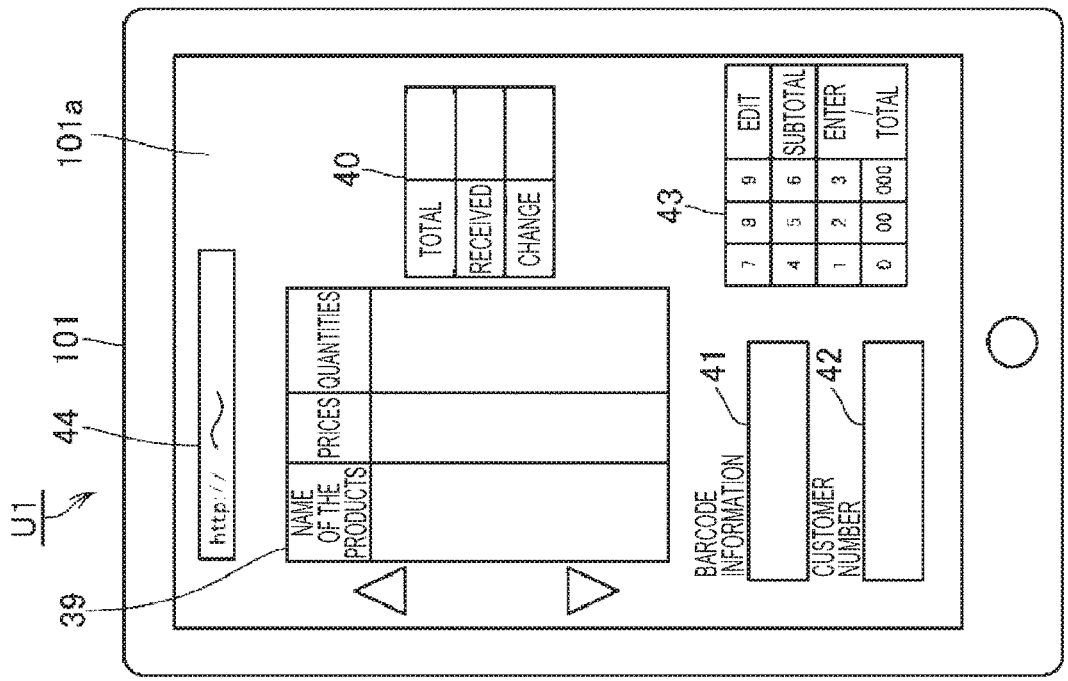
FIG. 5 shows an example of a user interface presented on a tablet terminal.

The first tablet terminal 101 and the second tablet terminals 102 are tablet computers, and in this embodiment are terminals with a touch panel disposed to the display area on the front of the tablet enabling input by touch operations (see FIG. 5).

The first tablet terminal 101 is a tablet used by the checkout clerk (operator) that processes transactions at the checkout counter, and provides an appropriate user interface to the checkout clerk for processing transactions at the checkout counter as described further below.

The second tablet terminal 102 displays transaction-related information, such as the total amount of the transaction, for a customer at the checkout counter. More specifically, the second tablet terminal 102 is a device that functions as a so-called customer display. Devices with a dot matrix display panel having a resolution of several ten by several hundred dots are commonly used as customer displays in a POS system. The POS system 1 according to this embodiment of the invention, however, can use a general-purpose tablet terminal as the customer display, and compared with a conventional customer display can display dynamic, high resolution images. The second tablet terminal 102 is disposed at an appropriate location where it can be seen by the customer at the checkout counter. Some of the second tablet terminals 102 can obviously also be disposed to locations away from the checkout counter.

The host device 11 is a device including a POS server 17 and a device server 18. The POS server 17 is a server device that manages the POS system 1, and provides data to the first tablet terminal 101, for example.

A barcode scanner 12 and card reader 13 are connected as input devices (input devices) to the device server 18. The barcode scanner 12 reads barcodes from products or product packaging, and outputs the read result to the device server 18. The barcode scanner 12 may connect to the device server 18 by near-field communication using the Bluetooth™ standard, or may connect to a wired communication interface through a USB interface, for example. The card reader 13 reads credit cards and loyalty cards, for example, and outputs the read result to the device server 18. The card reader 13 may be a device that reads magnetic information from magnetic stripe cards, or a device that reads and writes to IC cards. The card reader 13 connects to the device server 18 through a wired communication interface using the USB standard, for example.

The device server 18 sends data input from the barcode scanner 12 and card reader 13 to the first tablet terminal 101. A cash drawer 14 that holds paper currency, coins, checks and gift certificates, for example, and a printer unit 21, are connected to the device server 18. The cash drawer 14 connects to the device server 18 by a wired communication interface conforming to a specific serial communication standard. The device server 18 drives and opens the cash drawer 14 based on data input from the first tablet terminal 101. The device server 18 also controls the printer unit 21 contained inside the cabinet of the host device 11, and prints receipts. The device server 18 also functions as a transmission device that sends display data to plural second tablet terminals 102.

The POS server 17 and device server 18 of the host device 11 may be embodied by separate hardware configurations. The functions of the POS server 17 and device server 18 may also be embodied by a computer embedded on the control board of the host device 11 running a program corresponding to the host device 11 and a program corresponding to the device server 18. Furthermore, the printer unit 21 is disposed in the same housing as the host device 11, but the control board of the printer unit 21 and the control board that operates as the POS server 17 and device server 18 may be separately disposed in the housing.

As shown in FIG. 2, the host device 11 has a server interface 32 that communicates with the first tablet terminal 101 and second tablet terminal 102, and is connected to the POS server 17 and device server 18. The server interface 32 has a specific network card or other communication interface, and operates as controlled by the POS server control unit 30 of the POS server 17 and the device control unit 20 of the device server 18. The server interface 32 sends and receives data according to a specific wireless communication protocol between the host device 11 and the first tablet terminal 101 and second tablet terminal 102 as controlled by the POS server control unit 30 and device control unit 20. As a result, the POS server 17 and the device server 18 communicate with the first tablet terminal 101 and the second tablet terminal 102 through the server interface 32.

The device server 18 includes a device control unit 20, a printer unit 21 (print unit), a wireless device communication unit 22, a wired device communication unit 24, and a storage unit 25.

The device control unit 20 controls parts of the device server 18, and includes a CPU, ROM, RAM, and other peripheral circuits not shown in the figure. The device control unit 20 includes a printer unit control unit 20a, a communication unit 20b, a device communication control unit 20c, and a data transmission unit 20d. These function blocks are embodied by the CPU of the device server 18 running a program, for example. The printer unit control unit 20a runs programs related to controlling the printer unit 21, and controls the printer unit 21.

The printer unit 21 includes a conveyance unit for conveying roll paper, a print mechanism that prints text and images on the roll paper by means of a thermal head, and a cutter mechanism that cuts the roll paper. After printing a receipt image on the roll paper, the printer unit 21 cuts the roll paper at a specific position and issues a receipt. The cash drawer 14 is daisy chained to the printer unit 21. The printer unit control unit 20a connects to and communicates with the cash drawer 14 according to a specific serial communication protocol through the printer unit 21. The printer unit 21 controls the cash drawer 14 as controlled by the printer unit control unit 20a and causes the cash drawer 14 to open, for example.

The communication unit 20b controls communication with the first tablet terminal 101 and the second tablet terminal 102 by executing a communication control program.

The communication unit 20b is connected to the first terminal control unit 261 through the terminal interface 271, and receives data sent from the first terminal control unit 261. The communication unit 20b also has a function for storing the received data in the transmission buffer 26 disposed in the storage unit 25 as described below.

The communication unit 20b is connected to the second terminal control unit 262 through the terminal interface 272. The communication unit 20b has a function for sending data received from the first tablet terminal 101 to the second terminal control unit 262 in cooperation with the data transmission unit 20d. The data transmission unit 20d sends data in the transmission buffer 26 of the storage unit 25 described below to the second tablet terminal 102.

The device communication control unit 20c runs a device control program to communicate with each device and control each device.

The program related to controlling the printer unit 21, program related to controlling communication, and the program related to device control are created using a dedicated API (Application Programming Interface) provided by the manufacturer of the host device 11, for example, and the device control unit 20 runs these programs.

The wireless device communication unit 22 communicates wirelessly with the barcode scanner 12 using a near-field communication standard such as Bluetooth (T), for example, and includes a link manager, a link controller, a high frequency circuit, and an antenna. The device communication control unit 20c reads and runs a Bluetooth driver stack to control Bluetooth hardware. As a result, the device communication control unit 20c controls the wireless device communication unit 22 and communicates with the barcode scanner 12 by near-field communication using the Bluetooth standard.

The wired device communication unit 24 has a network interface card connected to a physical port, and communicates by wire according to a specific communication protocol such as USB with the card reader 13. The device communication control unit 20c controls the wired device communication unit 24, and exchanges data and signals with the card reader 13.

The storage unit 25 includes a nonvolatile storage device such as a magnetic or optical storage medium or a semiconductor storage device. The storage unit 25 stores programs and data readably and rewritably by the CPU. Multiple transmission buffers 26 (storage areas) described below are formed in the storage unit 25. Buffer link information 27 (correlation information) described below is stored in the storage unit 25. One transmission buffer 26 corresponds to one storage area, and another transmission buffer 26 corresponds to a second storage area.

The POS server 17 includes a POS server storage unit 31 that stores a database storing product-related information, a database for managing sales, and a database for managing inventory, and uses these databases to manage the POS system 1.

The POS server 17 also has a POS server control unit 30 and POS server storage unit 31, and is connected to the server interface 32.

The POS server control unit 30 controls the POS server 17 and includes a CPU, ROM, RAM, and other peripheral circuits not shown. As described above, the CPU, ROM, RAM, and other peripheral circuits of the POS server control unit 30 may be the same as those of the device control unit 20.

The POS server storage unit 31 includes a nonvolatile storage device such as a magnetic or optical storage medium or a semiconductor storage device. The POS server storage unit 31 stores programs and data readably and rewritably by the CPU. The POS server storage unit 31 and the storage unit 25 may be embodied by a common device.

The POS server storage unit 31 stores an application 35 so that the application 35 can be loaded. The application execution unit 30a reads and runs the application 35, and executes processes alone or in conjunction with a first browser execution unit 261a. The application execution unit 30a generates data for web pages requested by the first tablet terminal 101 or the second tablet terminal 102, or reads and sends the data from the POS server storage unit 31 to the device that sent the request. The terminals display screens as described below based on the received web page data.

The first tablet terminal 101 includes a first terminal control unit 261, a terminal interface 271, a display control unit 281, an input detection unit 291, and a touch panel 101a.

The touch panel 101a includes a display panel 101c disposed to the front of the first tablet terminal 101, and a touch sensor 101b disposed over the display panel 101c. The display panel 101c may be an LCD panel, an OLED panel, e-paper, or other type of display, and is driven by the display control unit 281. The touch sensor 101b is a capacitive or pressure-sensitive sensor disposed over the display panel 101c, detects touch operations by the user's finger, stylus, or similar device, and inputs a signal indicating the position where the operation was detected to the input detection unit 291.

The display control unit 281 drives the display panel 101c based on display data input from the first browser execution unit 261a described below, drives the display panel 101c, and displays a window containing text or images on the display panel 101c.

The input detection unit 291 detects the touch operation on the touch panel 101a based on the signals output by the touch sensor 101b. When an operation is detected, the input detection unit 291 generates coordinate data indicating the operated position by means of coordinates corresponding to the display position on the display panel 101c, and outputs to the first browser execution unit 261a.

The first terminal control unit 261 includes a CPU, ROM, RAM, and other peripheral circuits, and controls the first tablet terminal 101. The first terminal control unit 261 includes a first browser execution unit 261a that renders the function of a browser by running a browser program.

The first browser execution unit 261a downloads a web page written in HTML or other markup language, or a scripting language, from the POS server 17 by a function of the browser. The data for the downloaded web page is stored in RAM not shown, for example. The first browser execution unit 261a reads the data of the downloaded web page by a function of the browser, generates display data for displaying the web page, and outputs to the display control unit 281. By the functions of scripts embedded on the web page, the first browser execution unit 261a independently or in conjunction with the application execution unit 30a executes processes. The first tablet terminal 101 therefore performs the operations of a POS terminal device through the operation of the first browser execution unit 261a, or the cooperation of the first browser execution unit 261a and application execution unit 30a of the POS server 17.

The first browser execution unit 261a determines the input content of a touch operation based on the coordinate data input from the input detection unit 291 in response to a touch operation on the touch sensor 101b, and the display data output to the display control unit 281. The first browser execution unit 261a runs an appropriate process by a script function based on the identified input content as needed, and sends data representing the identified input content to the POS server 17. The application execution unit 30a then executes a process based on the input data. The first browser execution unit 261a also receives data about the result of the application execution unit 30a running an application program from the POS server 17, and generates and outputs display data reflecting the received data to the display control unit 281.

The terminal interface 271 communicates with the device server 18 and the POS server 17 according to a specific wireless communication protocol as controlled by the first terminal control unit 261. The terminal interface 271 and first terminal control unit 261 work together to function as a transmission unit that sends data from a browser.

Like the first tablet terminal 101, the second tablet terminal 102 includes a second terminal control unit 262 (second control unit), a terminal interface 272, a display control unit 282, an input detection unit 292, and a touch panel 102a.

The touch panel 102a includes a display panel 102c (display unit) disposed to the front of the second tablet terminal 102, and a touch sensor 102b disposed over the display panel 102c. The display panel 102c may be an LCD panel, an OLED panel, e-paper, or other type of display, and is driven by the display control unit 282. The touch sensor 102b is a capacitive or pressure-sensitive sensor disposed over the display panel 102c, detects touch operations by the user's finger, stylus, or similar device, and inputs a signal indicating the position where the operation was detected to the input detection unit 292.

The input detection unit 292 detects the touch operation on the touch panel 102a based on the signals output by the touch sensor 102b. When an operation is detected, the input detection unit 292 generates coordinate data indicating the operated position by means of coordinates corresponding to the display position on the display panel 102c, and outputs to the second browser execution unit 262a.

The second terminal control unit 262 includes a CPU, ROM, RAM, and other peripheral circuits, and controls the second tablet terminal 102. The second terminal control unit 262 includes a second browser execution unit 262a that renders the function of a browser by running a browser program.

The second browser execution unit 262a downloads a web page written in HTML or other markup language, or a scripting language, from the device server 18 by a function of the browser. The data for the downloaded web page is stored in RAM not shown, for example. The second browser execution unit 262a reads the data of the downloaded web page by a function of the browser, generates display data for displaying the web page, and outputs to the display control unit 282.

Figure 3:
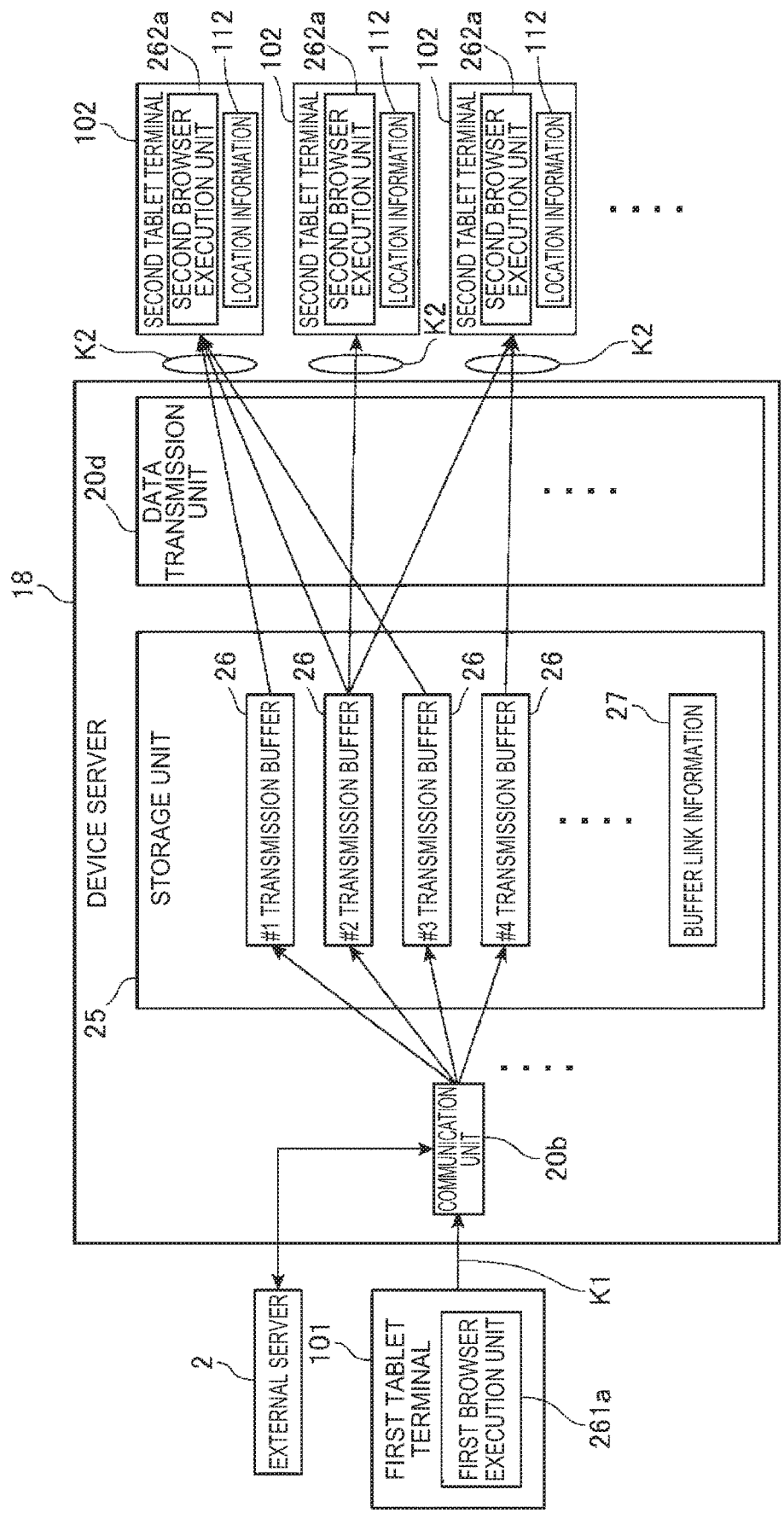
FIG. 3 describes the data transmission operation in the POS system.

The second browser execution unit 262a may store the web page to display in ROM (not shown in the figure). This web page data is the location information 112 described below (FIG. 3). As described below with reference to FIG. 5(B), various display areas for displaying information related to a transaction processed by the POS system 1 are located in the screen displayed on the display panel 102c. Data setting the location and size of these display areas, and borders around display screens, for example, is included in the location information 112 of the second browser execution unit 262a. A script for acquiring the data to be displayed in the display areas is also included in the location information 112. Data related to the content of the transaction process is included in the window displayed by the second browser execution unit 262a, and this data is sent from the device server 18 when executing the transaction process and changes according to the content of the transaction process. Information for arranging data sent from the device server 18 is included in the location information 112. The second browser execution unit 262a generates display data placing the data sent from the device server 18 during the transaction process in the display areas based on the location information 112, and outputs the display data to the display control unit 282 for display on the display panel 102c. Each time new data is received from the device server 18, the second browser execution unit 262a places the new data in the appropriate display area, and updates the display data. As a result, the second browser execution unit 262a can dynamically display data.

In the second tablet terminal 102 according to this embodiment, the terminal interface 272 and second terminal control unit 262 work together to function as a reception unit that receives data sent from the communication unit 20b. The touch panel 102a also functions as a display unit that displays a browser controlled by the second terminal control unit 262 (output control unit).

In the following description, the first tablet terminal 101 and second tablet terminal 102 are appropriately referred to generically as terminals.

FIG. 3 illustrates sending and receiving data between the first tablet terminal 101, device server 18, and second tablet terminal 102. The relationship between the communication unit 20b, data transmission unit 20d, first browser execution unit 261a, and second browser execution unit 262a of the device control unit 20 is shown schematically in FIG. 3 suitably for description.

In this embodiment of the invention data can be sent from the first browser execution unit 261a to the second browser execution unit 262a through the communication unit 20b. The function blocks used to sent data from the first browser execution unit 261a to the second browser execution unit 262a are shown in FIG. 3.

When the POS system 1 starts, a first path K1, which is a communication path for sending and receiving data, is established between the first browser execution unit 261a and the communication unit 20b. More specifically, the first browser execution unit 261a and the communication unit 20b open a connection conforming to the WebSocket standard. The first path K1 is rendered by the first browser execution unit 261a and the communication unit 20b creating a software interface for sending and receiving data using the WebSocket standard. The first path K1 is a WebSocket communication path that uses the Socket.iolibrary, for example, but a different standard, such as Comet, may be used.

When the POS system 1 starts, a second path K2, which is a communication path for sending and receiving data, is also opened between the second browser execution unit 262a and the communication unit 20b. Like the first path K1, the second path K2 is a communication path based on a connection opened according to the WebSocket standard. Plural second tablet terminals 102 can connect to the device server 18 for use in the POS system 1. As a result, when the POS system 1 starts, or at a specific time after starting, the second tablet terminals 102 used in the POS system 1 are connected to the device server 18. When connecting, each second tablet terminal 102 opens a second path K2 to the device control unit 20. The second path K2 is a communication path enabling push communication conforming to the WebSocket standard. As a result, after the second path K2 is opened, the device control unit 20 can push data to the second browser execution unit 262a. More specifically, the process of the second browser execution unit 262a sending a request to the device control unit 20, and the device control unit 20 sending data as a response to the request, is not required. When there is data that should be sent to the second browser execution unit 262a, the device control unit 20 can also push the data to the second browser execution unit 262a.

Multiple transmission buffers 26 are created in the storage unit 25. A transmission buffer 26 is a storage area reserved in a portion of the data storage area of the storage unit 25. A transmission buffer 26 can also be newly created or deleted as controlled by the data transmission unit 20d. Unique identification information is also assigned by the data transmission unit 20d to each transmission buffer 26 created in the storage unit 25. In the example shown in FIG. 3, the numbers #1 to #4 are assigned as the identification information, but the identification information must only be able to identify each transmission buffer 26, and may be a code (name) including alphanumeric characters, for example.

A transmission buffer 26 is linked to the second tablet terminal 102 that created the second path K2 to the device control unit 20. The second tablet terminal 102 linked to the transmission buffer 26 may be any second tablet terminal 102 that opened a second path K2. Multiple transmission buffers 26 can be linked to one second tablet terminal 102, and multiple second tablet terminals 102 can be linked to one transmission buffer 26.

The relationship between each of the transmission buffers 26 and second tablet terminals 102 is defined by the buffer link information 27. The buffer link information 27 is created and updated by the data transmission unit 20d whenever the device control unit 20 and a second tablet terminal 102 open a second path K2. More specifically, when one second tablet terminal 102 opens a second path K2, the transmission buffer 26 linked to that second tablet terminal 102 is selected, and the buffer link information 27 related to that link is created or updated by the data transmission unit 20d. In this event the data transmission unit 20d functions as a link information control unit.

The buffer link information 27 is a file that records these link relations using the identification information identifying a particular transmission buffer 26 and identification information identifying a particular second tablet terminal 102, for example. The identification information identifying a second tablet terminal 102 may be the ID assigned to the second path K2, the name of the second tablet terminal 102, or the IP address of the second tablet terminal 102, for example.

When the device control unit 20 sends data to the second browser execution unit 262a, the first browser execution unit 261a sends the data through the first path K1 to the communication unit 20b. The communication unit 20b then stores the data received through the first path K1 to the transmission buffer 26 in the storage unit 25. At this time the communication unit 20b selects the transmission buffer 26 linked to the data sent through the first path K1 for storage. For example, if the first browser execution unit 261a sends information specifying the transmission buffer 26 to store the data with the data, the communication unit 20b may store the received data in the transmission buffer 26 specified by the information. The information specifying the transmission buffer 26 used to store the data may be added to or included in the data the first browser execution unit 261a sends.

The communication unit 20b may also evaluate an attribute of the data received from the first browser execution unit 261a, and store the data in the transmission buffer 26 previously related to that attribute. More specifically, the #1 transmission buffer 26 may be used for product codes, the #2 transmission buffer 26 used for the transaction total, and the #3 transmission buffer 26 related to image data for product images. In this event, if the first browser execution unit 261a sends image data for a product image, the communication unit 20b stores the received image data to the #3 transmission buffer 26. The attributes evaluated by the communication unit 20b may be the function of the data in a transaction process related to product sales as described above, or the format of the actual data, such as image data and text data. Information identifying an attribute of the data (attribute data) may also be included in the data the first browser execution unit 261a sends to the device server 18.

The data transmission unit 20d detects that the communication unit 20b stored data in a transmission buffer 26, and determines in which transmission buffer 26 the new data was stored. The second tablet terminal 102 that is linked to the identified transmission buffer 26 is also selected based on the buffer link information 27. The data transmission unit 20*d* then sends the new data stored in the transmission buffer 26 to the selected second tablet terminal 102. In this event, the data transmission unit 20*d* pushes the data through the second path K2 by a function of the printer unit control unit 20*a*. As a result, the data the first browser execution unit 261*a* sent to the device control unit 20 is also sent to the linked second tablet terminal 102.

When sending data stored in the transmission buffer 26 to the second tablet terminal 102, the data transmission unit 20*d* also sends the identification information for the transmission buffer 26 stored in the data. The second tablet terminal 102 receives the data and the identification information of the transmission buffer 26 where the data was stored.

When the data sent through the second path K2 is received, the second browser execution unit 262*a* generates and outputs display data for displaying the received data to the display control unit 282 (FIG. 1) and displays the data on the display panel 102*c*. More specifically, the second browser execution unit 262*a* references the location information 112, and displays the data on the display panel 102*c* in the display format defined in the location information 112. In addition to information related to the location and size of the display area on the display panel 102*c*, information specifying the display area for displaying data received from the device control unit 20 is also included in the location information 112. This information includes the identification information of the transmission buffer 26 that stored the received data linked to the area for displaying the received data.

In the example shown in FIG. 3, when the communication unit 20*b* stores data to the #2 transmission buffer 26, this data is pushed to three second tablet terminals 102 as controlled by the data transmission unit 20*d*. The second browser execution unit 262*a* that receives the data then displays the received data in the display area linked to the #2 transmission buffer 26 in the location information 112. Note that information specifying the font used to display text data, the image size for displaying image data, or the background color, for example, may be included in the location information 112 as information specifying the display format of the received data.

When data previously received from the device control unit 20 is displayed and new data stored in the same transmission buffer 26 as the data being displayed is sent from the device control unit 20, the second browser execution unit 262*a* replaces the data being displayed with the new data. As a result, the data displayed on the display panel 102*c* is updated. The data transmission unit 20*d* can also send a command instructing deleting the data being displayed, and can send null data as the new data stored in the transmission buffer 26. In this event, the second browser execution unit 262*a* stops displaying all or part of the data being displayed.

All or part of the information contained in the location information 112 may be contained in the buffer link information 27. More specifically, information specifying the display format of the data stored in the transmission buffer 26 can be included relationally to the transmission buffer 26 in the buffer link information 27. When sending data stored in the transmission buffer 26 to the second tablet terminal 102 according to the buffer link information 27, the data transmission unit 20*d* also sends information specifying the display format contained in the buffer link information 27. The second browser execution unit 262*a* of the second tablet terminal 102 that receives the data then displays the received data according to the information specifying the display format that is received with the data. The information specifying the display format is, for example, information specifying the font for displaying text data, the display size when displaying image data, or information specifying the background color. This has the advantage of being able to control the display format of data on the second tablet terminal 102 from the host device 11.

When the buffer link information 27 contains information specifying the display format of data, the second tablet terminal 102 may store or not store the location information 112. When the second tablet terminal 102 stores the location information 112, the second browser execution unit 262*a* may determine the display format to prioritize the information specifying the display format contained in the buffer link information 27 or prioritize the location information 112. Further alternatively, the second browser execution unit 262*a* may determine the display format based on both the location information 112 and the display format information contained in the buffer link information 27.

The process of sending data stored in the transmission buffer 26 of the storage unit 25 to the second tablet terminal 102 is not limited to configurations in which the data transmission unit 20*d* controls transmission and pushes data from the device server 18.

For example, the data transmission unit 20*d* may control reporting the relationship to the buffer link information 27 to each second tablet terminal 102. In this event, the second terminal control unit 262 may access the transmission buffer 26 to acquire the data based on the relationship reported from the device server 18. In this case, the second tablet terminal 102 may store information showing the relationship between the transmission buffer 26 and the second tablet terminal 102 that is set in the buffer link information 27, or the buffer link information 27 itself. Alternatively, a storage area synchronized with the transmission buffer 26 may be provided in the second tablet terminal 102, and the second terminal control unit 262 or the data transmission unit 20*d* may control synchronizing the data in this storage area with the transmission buffer 26. When data is stored in the transmission buffer 26 by any of these methods, the data stored in the transmission buffer 26 is sent to the second tablet terminal 102 linked to the transmission buffer 26 based on the relationship set in the buffer link information 27.

Figure 4:
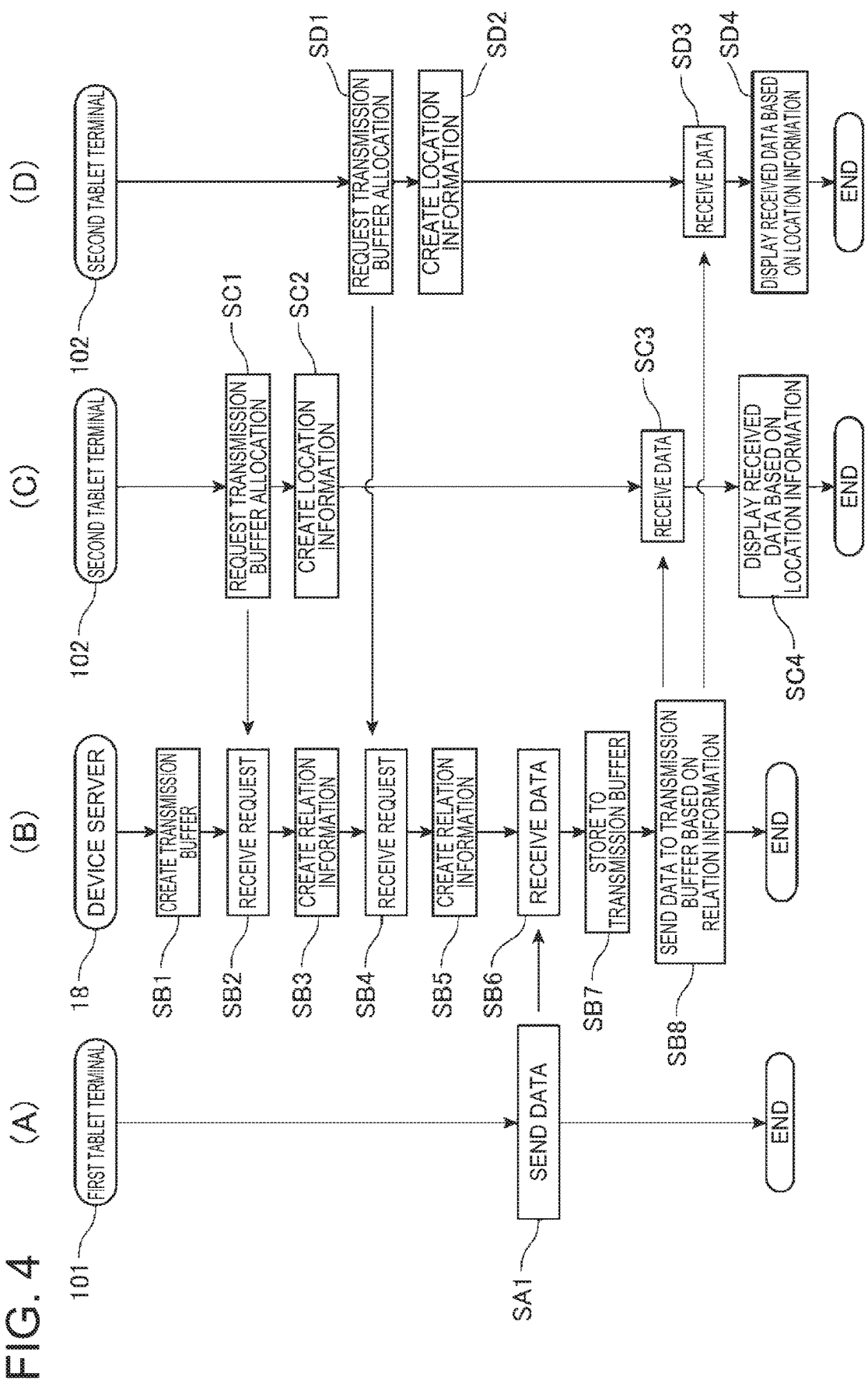
FIG. 4 is a flow chart of the operation of devices in the POS system.

The operation related to data transmission shown in FIG. 3 is illustrated in the flow chart in FIG. 4. FIG. 4 illustrates the operation of parts of the POS system 1, column (A) showing the operation of the first tablet terminal 101, (B) the operation of the device server 18, (C) the operation of a second tablet terminal 102, and (D) the operation of a second tablet terminal 102.

First, the data transmission unit 20*d* creates a transmission buffer 26 in the storage unit 25 of the device server 18 (step SB1). The transmission buffer 26 is created in response to a manual operation on the host device 11, or to a request from the first tablet terminal 101. When a connection is made with a second tablet terminal 102, the transmission buffer 26 may also be created in response to a request from the second tablet terminal 102.

The device control unit 20 and second tablet terminal 102 then connect by WebSocket, a second path K2 is established, and allocation of a transmission buffer 26 is requested from the second tablet terminal 102 (step SC1). The data transmission unit 20*d* receives the request from the second tablet terminal 102 (step SB2), and creates the buffer link information 27 according to the received request (step SB3). If the buffer link information 27 already exists, the data transmission unit 20*d* updates the buffer link information 27 to include the requested link. The second browser execution unit 262*a* of the second tablet terminal 102 that requested a transmission buffer 26 then generates location information 112 based on the requested allocation, or updates existing location information 112 (step SC2). When another second tablet terminal 102 requests allocation of a transmission buffer 26 (step SD1), the data transmission unit 20*d* likewise receives the request (step SB4), and updates the buffer link information 27 (step SB5). The second browser execution unit 262*a* of the second tablet terminal 102 that requested this transmission buffer 26 likewise generates location information 112 of content corresponding to the requested allocation, or updates existing location information 112 (step SD2).

When the second browser execution unit 262*a* then sends data (step SA1), the communication unit 20*b* receives the data (step SB6), and stores the received data in the transmission buffer 26 linked to the data (step SB7). In this event, the data transmission unit 20*d* detects that new data was stored by the communication unit 20*b* in the transmission buffer 26, and based on the buffer link information 27 sends the data through the second path K2 (step SB8). The second browser execution unit 262*a* that receives the data (step SC3) then generates display data with the received data arranged according to the location information 112 and displays the data on the display panel 102*c* (step SC4). The second browser execution unit 262*a* of the other second tablet terminal 102 to which data was simultaneously sent also receives the data (step SD3) and displays the received data based on the location information 112 (step SD4).

When the server interface 32 can connect to an external server 2, the communication unit 20*b* can also acquire data from the external server 2. The external server 2 is a server on an external open network such as the Internet, or a closed network including the POS system 1. A specific example of an external server 2 is a server that provides a service transmitting weather information. The communication unit 20*b* accesses the external server 2 based on a previously set IP address or URL, acquires data from the external server 2, and stores the data in the transmission buffer 26 (such as #4) linked to the external server 2. This data is read by the data transmission unit 20*d* from the transmission buffer 26, and sent to the second tablet terminal 102 linked to the #4 transmission buffer 26. As a result, weather information, for example, can be sent to the second tablet terminal 102, and the weather information can be displayed on the display panel 102*c*.

Before a transaction-related process is executed, the first tablet terminal 101 and second tablet terminal 102 each execute the following process.

The operator of a cash register in the POS system 1 or other person instructs displaying the first user interface U1 by a touch operation on the touch panel 101*a*. In response to this command, the first browser execution unit 261*a* accesses a specified address on the POS server 17, acquires data for a web page, such as an HTML file, and displays the first user interface U1 based on the acquired data. A program for executing transaction-related processes as described below, for example, in conjunction with the application execution unit 30*a* is embedded (written) in a specific scripting language in the web page data.

FIG. 5 shows a user interface displayed on a tablet terminal. FIG. 5(A) shows an example of the first user interface U1 presented on touch panel 101*a*. FIG. 5(B) shows an example of a second user interface U2 displayed on touch panel 102*a*.

A list display area 39 where the names of the products purchased by the customer, the prices of the products, and the quantities of the products are presented in a list is displayed at the top left of the first user interface U1 in FIG. 5(A). To the right of this list display area 39 is presented an amount display area 40 where the total amount of the products purchased by the customer, the amount of money received from the customer in the transaction, and the amount of change due to the customer are displayed.

Below the list display area 39 is a barcode information input field 41, which is an input field where the information (referred to below as barcode information) expressed by the barcode that is read by the barcode scanner 12 is input and displayed. The barcode information is basically identification information uniquely assigned to each type of product.

Below the barcode information input field 41 is a customer number input field 42, which is an input field where the customer number acquired by reading a customer loyalty card with the card reader 13 is input and displayed when a card is read.

A virtual keypad 43 is displayed on the right side of the barcode information input field 41 and the customer number input field 42. Information can be input through the virtual keypad 43 to the various fields presented in the first user interface U1, and the virtual keypad 43 includes the keys required to input information.

An address input field 44 where the accessed address is displayed is presented at the top of the first user interface U1.

The second tablet terminal 102 is described next. As described above, the second tablet terminal 102 is a terminal that functions as a customer display to provide transaction-related information to the customer.

Before the transaction process starts, the checkout clerk or other worker starts the browser of the second tablet terminal 102, and commands displaying the second user interface U2 by touching the touch panel 102*a*. Based on this command, the second browser execution unit 262*a* accesses a specific address on the POS server 17, acquires the web page data from an HTML file, for example, and displays the second user interface U2 based on the acquired data.

A purchased product display area 55 where the names of the products purchased by the customer, the prices of the products, and the quantities of the products are presented in a list is displayed at the top part of the second user interface U2 in FIG. 5(B). Below this purchased product display area 55 is a transaction total display area 56 where the total amount of the products purchased by the customer is displayed. Below the transaction total display area 56 is an amount-received display area 57 where the amount of money received from the customer for the transaction is displayed. Below the amount-received display area 57 is a change-due display area 58 where the amount of change to be given to the customer is displayed.

An information display area 59 is located at the bottom of the second user interface U2. The information display area 59 is an area for displaying weather information the communication unit 20*b* acquires from the external server 2 as described above, for example.

The display format of the second user interface U2 is defined by the location information 112. The product display list area 55, transaction total display area 56, amount-received display area 57, change-due display area 58, and information display area 59 are linked to the identification information of a transmission buffer 26. For example, if the information display area 59 is linked to the #4 transmission buffer 26 and the second browser execution unit 262a receives meteorological information stored in the #4 transmission buffer 26, the meteorological information is displayed in the information display area 59. When new meteorological information is sent from the device control unit 20, the content displayed in the information display area 59 is updated.

Figure 6:
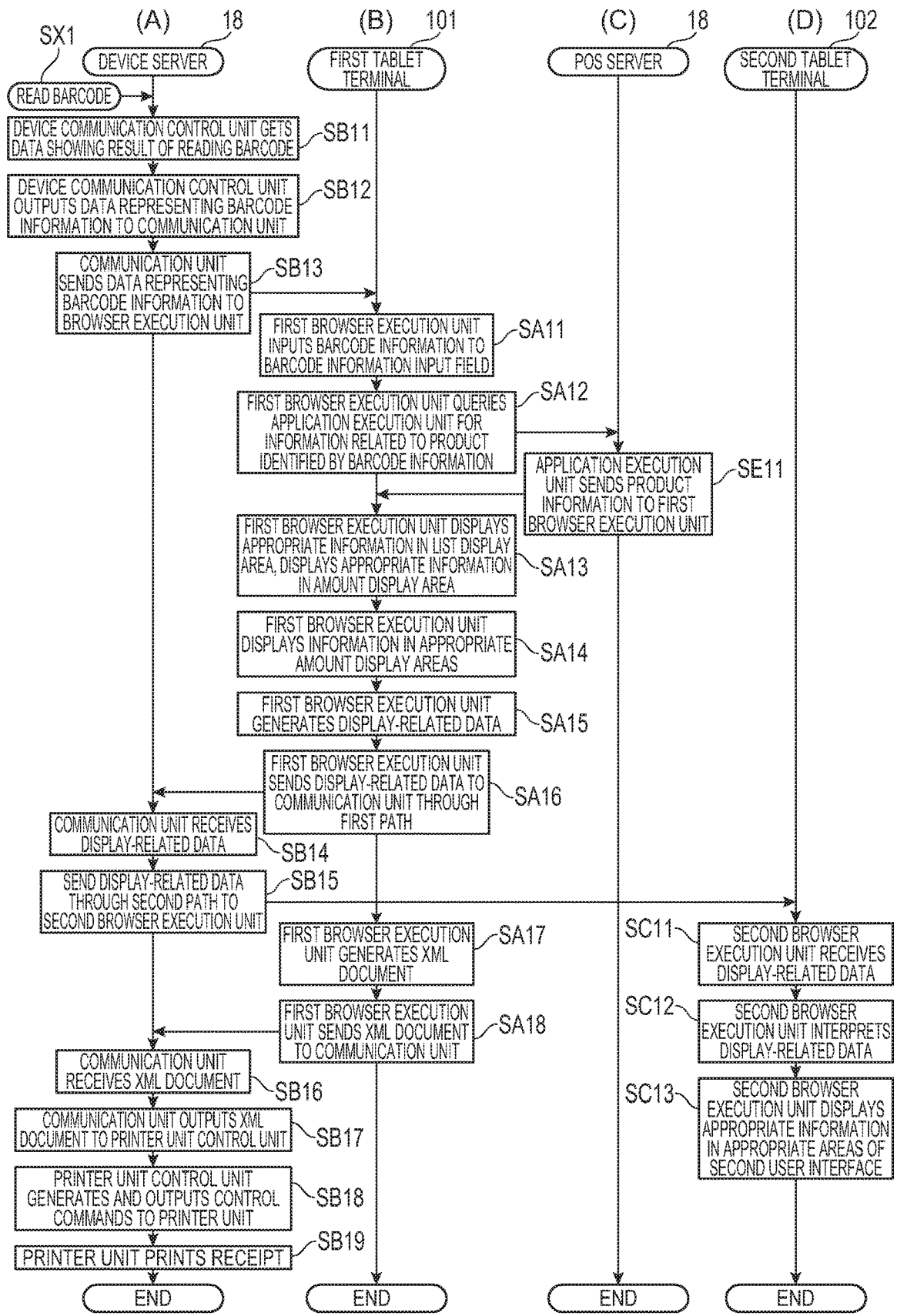
FIG. 6 is a flow chart of the operation of devices in the POS system.

FIG. 6 is a flow chart of the operation of devices in the POS system 1. FIG. 6(A) shows the operation of the device server 18, (B) shows the operation of the first tablet terminal 101, (C) shows the operation of the POS server 17, and (D) shows the operation of a second tablet terminal 102. FIG. 7 illustrates the user interface presented on the tablet terminal, FIG. 7(A) showing the first user interface U1 and (B) showing the second user interface U2.

The operation of the devices is described below with reference to FIG. 6 and FIG. 7 using the operation when a customer purchases one product as an example.

At the checkout counter, the checkout clerk first uses the barcode scanner 12 to scan the barcode on the one product purchased by the customer (step SX1).

The device communication control unit 20c acquires data showing the result of reading by the barcode scanner 12 through the wireless device communication unit 22 (step SB11). Based on the data showing the read result, the device communication control unit 20c also generates data (input data) indicating the barcode information, and outputs the data (input data) indicating the barcode information to the communication unit 20b (step SB12). The communication unit 20b sends the data (input data) indicating the barcode information to the first browser execution unit 261a according to a specific protocol (step SB13).

When the data (input data) representing the barcode information is input, the first browser execution unit 261a inputs the barcode information to the barcode information input field 41 by a function of the program (referred to below as simply a "script") embedded in the HTML file related to the first user interface U1 (step SA11). Next, by a function of the script, the first browser execution unit 261a communicates with the application execution unit 30a, and requests the product name and price of the product identified by the barcode information (step SA12). The application execution unit 30a that receives the request accesses the appropriate database by a function of the application 35, acquires the required information, and outputs the acquired information to the first browser execution unit 261a (step SE11).

The first browser execution unit 261a displays the name of the product the customer purchased, the price of the product, and the quantity of the product in the list display area 39, and displays the total amount of the product the customer purchased in the specific field of the amount display area 40, by a function of the script (step SA13). Next, when an operation finalizing the purchase transaction is executed by the checkout clerk through the virtual keypad 43, payment is received from the customer and change is made. In conjunction therewith, the first tablet terminal 101 is operated, the first browser execution unit 261a communicates appropriately with the application execution unit 30a by a function of the script, and displays the information in the appropriate fields of the amount display area 40 (step SA14).

FIG. 7(A) shows an example of the first user interface U1 displayed when step SA14 is completed. As shown in FIG. 7(A), when step SA14 is completed, the appropriate information is input and displayed in the respective areas of the first user interface U1 by a function of the first browser execution unit 261a (a function of the browser).

Next, the first browser execution unit 261a generates the display-related data for displaying information in the respective areas of the second user interface U2 by a script function (step SA15). The first browser execution unit 261a generates the display data based on the input data sent by the device server 18. The first browser execution unit 261a sends the generated display-related data through the first path K1 to the communication unit 20b (step SA16).

When the communication unit 20b receives the display-related data, it stores the received display-related data in the transmission buffer 26 (step SB14). The data transmission unit 20d also sends the display-related data stored in the transmission buffer 26 through the second path K2 to the second browser execution unit 262a (step SB15).

The display-related data is data written in JSON (Java Script Object Notation), for example, and is the data displayed in each display area of the second user interface U2. More specifically, the display-related data contains information indicating the product name, price, and quantity of the product the customer purchased written according to a specific protocol. This data is the information to be displayed in the purchased product display area 55 of the second user interface U2, and is stored by the communication unit 20b in the transmission buffer 26. The transmission buffer 26 is linked to the product display list area 55 by the location information 112, and is displayed in the product display list area 55 as described below. Likewise, information indicating the total amount of the products the customer purchased is written in the display-related data as the information to display in the transaction total display area 56. Information indicating the amount of money received from the customer for the transaction is also written in the display-related data as the information to display in the amount-received display area 57. Information indicating the amount of change due to the customer is also written in the display-related data as the information to display in the change-due display area 58. As known from the literature, data written in JSON is it can be processed by a JavaScript (T) or other script embedded in the HTML file of the web page. As a result, as in this embodiment, it can be used as the format for data sent from the first browser execution unit 261a embodied by a function of the browser to the second browser execution unit 262a. Configurations that exchange data in other formats are also conceivable.

When the second browser execution unit 262a receives the display-related data (step SC11), it interprets the display-related data written in JSON by a function of the script (step SC12). The second browser execution unit 262a then displays the information specified by the received data in the appropriate areas of the second user interface U2 based on the identification information of the transmission buffer 26 where the display-related data was stored and the location information 112 (step SC13).

FIG. 7(B) shows an example of the second user interface U2 when step SC13 is completed. As shown in FIG. 7(B), the second browser execution unit 262a displays information in the appropriate fields of the second user interface U2 according to the location information 112 based on the display-related data that was received. As a result, the customer making the transaction can confirm the information related to the transaction by reading the second user interface U2 presented on the touch panel 102a. More specifically, unlike a dot matrix display panel with a resolution of several ten by several hundred dots according to the related art, the transaction-related information is displayed on the touch panel 102a of the second tablet terminal 102, which is a tablet computer, in this embodiment of the invention. As a result, a large amount of information can be provided to the customer displayed on a high resolution, dynamic display unit.

Next, by a function of the script, the first browser execution unit 261a generates an XML document (data) containing information related to the receipt to be produced by the printer unit 21 (step SA17). Included in the XML document is the information required to produce a receipt, such as information about the text and images to be printed on the receipt, in an XML-compliant format. Next, the first browser execution unit 261a sends the generated XML document to the communication unit 20b using a specific protocol (step SA18).

When the XML document is sent by the first browser execution unit 261a, the communication unit 20b receives the XML document (step SB16) and outputs to the printer unit control unit 20a (step SB17).

The printer unit control unit 20a generates and outputs to the printer unit 21 control commands that are control commands conforming to the command language of the printer unit 21 based on the input XML document and cause the printer unit 21 to execute the processes related to producing a receipt (step SB18). The control circuit of the printer unit 21 then controls the related mechanisms and produces a receipt based on the control commands (step SB19).

Data that the device server 18 sent to the second tablet terminal 102 can also be resent in this POS system 1 in response to a request from the second tablet terminal 102.

Figure 8:
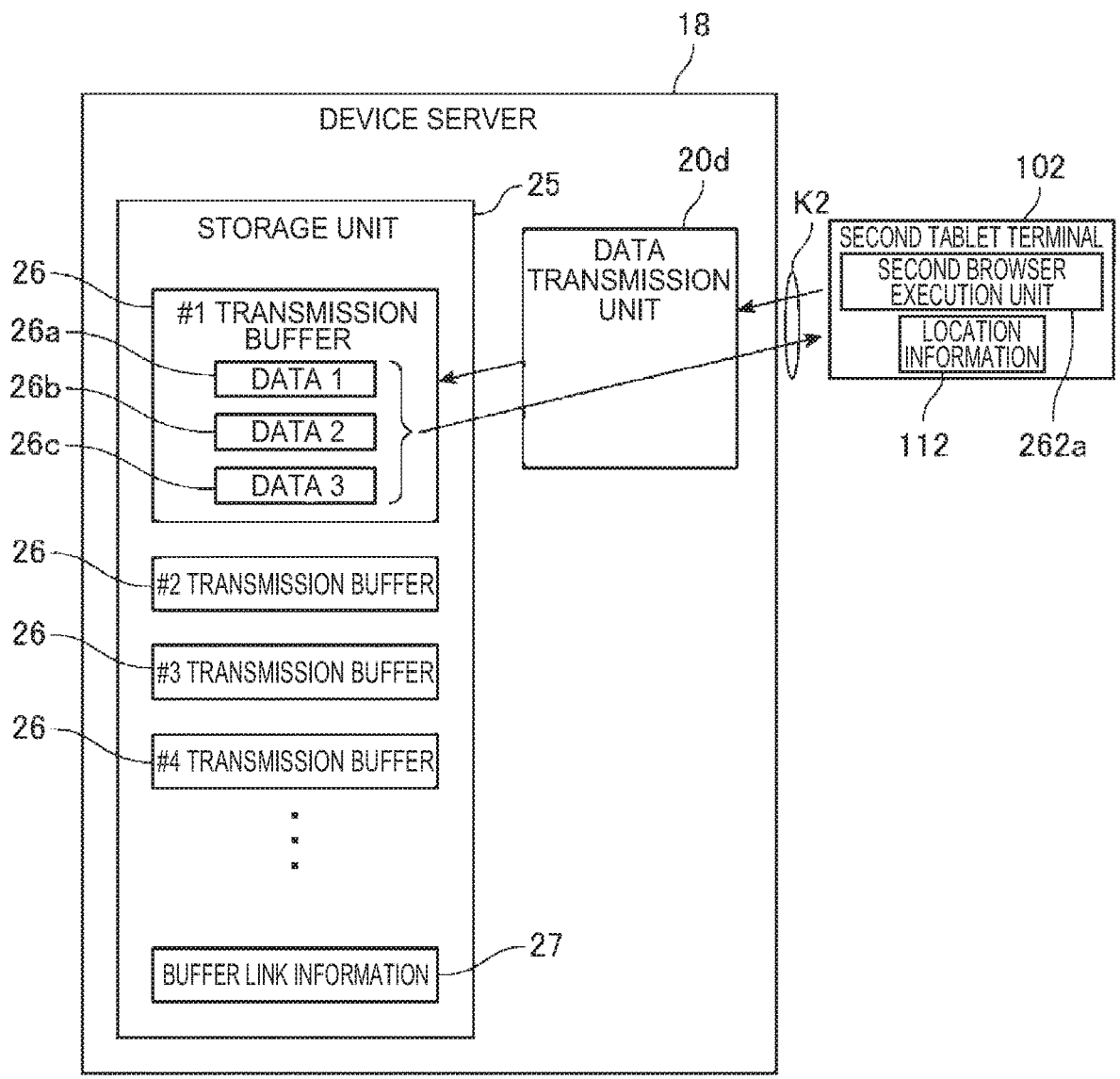
FIG. 8 describes the data retransmission operation in the POS system.
Figure 9:
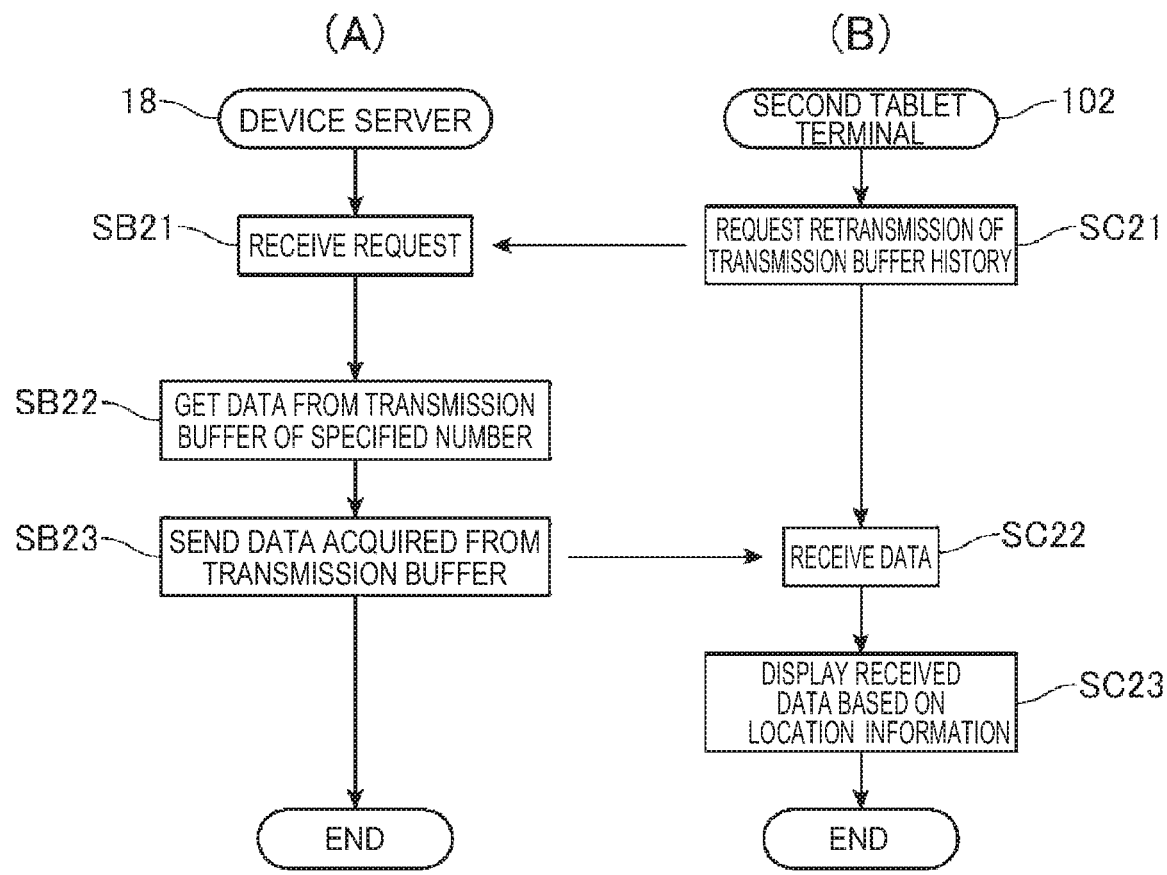
FIG. 9 is a flow chart of the operation of devices in the POS system.

FIG. 8 illustrates the data retransmission operation of the POS system 1. FIG. 9 also describes the operation of the POS system 1 when resending data. FIG. 9(A) shows the operation of the device server 18, and FIG. 9(B) shows the operation of the second tablet terminal 102.

When the second browser execution unit 262a fails to receive data sent from the data transmission unit 20d, the second browser execution unit 262a requests retransmission of the data through the second path K2 (step SC21). The second browser execution unit 262a requests retransmission when, for example, the data sent from the data transmission unit 20d is data not conforming to the specific format, or when receiving data from the data transmission unit 20d times out.

The request that the second browser execution unit 262a sends is a command requesting retransmission of data, and may include identification information for the transmission buffer 26 storing the data to be resent. The command may also simply contain information requesting retransmission of data.

When retransmission of data is requested from the second browser execution unit 262a, the data transmission unit 20d receives the request (step SB21), and acquires data from the transmission buffer 26 (step SB22). As shown in FIG. 8, when the command requesting data retransmission is sent from the second browser execution unit 262a with the identification information of the transmission buffer 26, the data transmission unit 20d reads the data from the transmission buffer 26 identified by the identification information. For example, when the #1 to #3 transmission buffers 26 are linked to the second tablet terminal 102, the second browser execution unit 262a can request retransmission of data from a subset of the three transmission buffers 26. When the data transmission unit 20d receives a command from the second browser execution unit 262a and identification information of a transmission buffer 26 is contained in the received command, the data transmission unit 20d may determine whether or not retransmission is possible based on the buffer link information 27. More specifically, the data transmission unit 20d determines retransmission of the data is not possible if the transmission buffer 26 specified by the identification information in the command received from the second tablet terminal 102 is not linked to the second tablet terminal 102 by the buffer link information 27. In this event, sending data that is not linked in the buffer link information 27 can be prevented.

When the second browser execution unit 262a requests retransmission by sending only a command not containing transmission buffer 26 identification information, the data transmission unit 20d reads data from the transmission buffer 26 linked by the buffer link information 27 to that second tablet terminal 102. More specifically, when a command requesting data retransmission is received, the data transmission unit 20d identifies the second tablet terminal 102 based on the IP address, for example, of the second tablet terminal 102 that sent the command. The data transmission unit 20d then determines the transmission buffers 26 linked by the buffer link information 27 to the specific second tablet terminal 102, and resends data from those transmission buffers 26.

The data transmission unit 20d sends the data read from the transmission buffers 26 to the second browser execution unit 262a sequentially from the data that was updated most recently, for example (step SB23). The data transmission unit 20d may add the identification information of the transmission buffers 26 storing the data to the data that is resent.

The second browser execution unit 262a then receives the retransmitted data (step SC22), and based on the location information 112 displays the received data on the display panel 102c (step SC23).

By resending data in this way, data can be displayed on the second tablet terminal 102 even if communication between the host device 11 and second tablet terminal 102 is interrupted or a problem occurs. The POS system 1 runs a transaction process related to product sales, and displays information related to the transaction process on the second tablet terminal 102. The customer is inconvenienced when information is not displayed, and this is undesirable for a business. By resending data, such problems can be avoided.

As shown in FIG. 8, the communication unit 20b can store different data in the same transmission buffer 26. The capacity of each transmission buffer 26 is allocated based on the storage capacity of the storage unit 25. Data can be stored to the allocated capacity of the transmission buffer 26.

For example, the communication unit 20b may add data to be sent to the second tablet terminal 102 to the transmission buffer 26, and may be configured to delete or overwrite data already stored in the transmission buffer 26. In this event, if the capacity of the transmission buffer 26 is exceeded when the communication unit 20b stores data to the transmission buffer 26, old data previously stored in the transmission buffer 26 is deleted or overwritten.

When data is already stored in the transmission buffer 26, the communication unit 20b may also compare the total size of the stored data and the new data to be stored (second data) with the previously set storage capacity of the transmission buffer 26. If the total size of the stored data and the second data is less than or equal to the capacity of the transmission buffer 26, the communication unit 20b leaves the previously stored data and adds the second data. If the total of the size of the data stored in the transmission buffer 26 and the size of the second data exceeds the capacity of the transmission buffer 26, the communication unit 20b overwrites the stored data with the second data. In this event, the communication unit 20b adds the acquired data to the transmission buffer 26 within the capacity of the transmission buffer 26, and does not delete or overwrite data stored in the transmission buffer 26. This stores more data in the transmission buffer 26 sequentially from the new data without exceeding the capacity of the transmission buffer 26.

When retransmission is requested by the second browser execution unit 262a, the data transmission unit 20d sends data from the corresponding transmission buffer 26 to the second browser execution unit 262a. As a result, if more data is stored in the transmission buffer 26, and a problem that lasts a long time occurs, more data that was not received due to the problem can be resent. As a result, even if a condition in which the second tablet terminal 102 cannot receive data occurs, the correct information can be displayed on the second tablet terminal 102 by resending the data.

As described above, in this embodiment of the invention, the POS system 1 described as an example of a transmission system has a second tablet terminal 102 that receives data, and a host device 11. The host device 11 includes a server interface 32 that sends data to the second tablet terminal 102, and a storage unit 25 that includes a transmission buffer 26 for storing data, and stores buffer link information 27 linking a transmission buffer 26 to a second tablet terminal 102.

The device server 18 of the host device 11 has a communication unit 20b that acquires data and controls storing data in the transmission buffer 26, and when the communication unit 20b stores data in the transmission buffer 26, sends the data to the second tablet terminal 102. As a result, when the device server 18 acquires new data, it sends the data to the second tablet terminal 102 without the second tablet terminal 102 requesting the device server 18 to send data. The second tablet terminal 102 to which data is sent can also be determined with a high degree of freedom.

The device server 18 also has a data transmission unit 20d. When the communication unit 20b stores data to the transmission buffer 26, the data transmission unit 20d sends the data stored in the transmission buffer 26 by the buffer link information 27 to the second tablet terminal 102 linked to the transmission buffer 26. As a result, when the device server 18 acquires new data, data is sent as controlled by the device server 18 to the second tablet terminal 102 linked to the buffer link information 27. The device server 18 can also determine the second tablet terminal 102 to which to send data with a high degree of freedom.

The POS system 1 has one second tablet terminal 102, and another second tablet terminal 102 that is different from the one second tablet terminal 102. The storage unit 25 has one transmission buffer 26, and another transmission buffer 26 that is different from the one transmission buffer 26. The buffer link information 27 links one transmission buffer 26 to one second tablet terminal 102, and links another transmission buffer 26 to another second tablet terminal 102. When the communication unit 20b sends data to a transmission buffer 26, the data transmission unit 20d sends the data to the second tablet terminal 102 linked to the transmission buffer 26 by the buffer link information 27. As a result, by linking plural transmission buffers 26 to plural second tablet terminals 102 by relation information, the second tablet terminal 102 to which to send data can be set as desired.

The POS system 1 has a first tablet terminal 101 that supplies data. The data the communication unit 20b acquires may include information specifying a transmission buffer 26. If such data is acquired, the communication unit 20b stores the data in the transmission buffer 26 specified by the device that provided the data. As a result, the data the communication unit 20b acquires is stored in the specified transmission buffer 26, and is sent to the second tablet terminal 102 linked to the transmission buffer 26 where the data is stored. As a result, the data can be sent to a specific second tablet terminal 102.

The data the communication unit 20b acquires may also include attribute information related to attributes of the data. When such data is acquired, the communication unit 20b stores the data in the transmission buffer 26 selected based on the data attributes. As a result, the data the communication unit 20b acquires is stored in the transmission buffer 26 corresponding to the data attributes, and is sent to the second tablet terminal 102 linked to the transmission buffer 26 where the data is stored. As a result, the data can be sent to a specific second tablet terminal 102.

The second tablet terminal 102 and device server 18 are connected by WebSocket, and the data transmission unit 20d generates buffer link information 27 relating each connected second tablet terminal 102 to a transmission buffer 26. As a result, the second tablet terminal 102 to which data is sent is connected to the device server 18 by WebSocket, and the connected second tablet terminal 102 is linked to the transmission buffer 26. The data the device server 18 acquired is sent to a second tablet terminal 102 based on this relationship.

The second browser execution unit 262a of the second tablet terminal 102 receives data sent from the device server 18 and displays it on a display panel 102c. The second browser execution unit 262a displays the data received from the device server 18 on the display panel 102c in a display format corresponding to the transmission buffer 26 where the data was stored. As a result, the second tablet terminal 102 can determine the display format for displayed the received data based on the transmission buffer 26 where the data was stored. As a result, data can be sent from the device server 18 to a second tablet terminal 102, and the data can be displayed in a specific display format.

When the second tablet terminal 102 requests retransmission of the data after data the communication unit 20b stored in the transmission buffer 26 is sent to the second tablet terminal 102 in this POS system 1, the data stored in the transmission buffer 26 is resent to the second tablet terminal 102. As a result, when the device server 18 acquires new data, the data can be sent to the related second tablet terminal 102 without the second tablet terminal 102 requesting transmission of data from the device server 18. When the second tablet terminal 102 requests retransmission of data, the data is resent to the second tablet terminal 102 that requested retransmission. As a result, data can be resent.

When retransmission of data is requested from a second tablet terminal 102, the data transmission unit 20d resends the data stored in the transmission buffer 26 related by the buffer link information 27 to the second tablet terminal 102 that requested retransmission. As a result, when the device server 18 receives new data, data is sent to the second tablet terminal 102 linked by the buffer link information 27 as controlled by the device server 18. When a second tablet terminal 102 requests retransmission of data, the data in the transmission buffer 26 linked to that second tablet terminal 102 is resent as controlled by the device server 18. Sending and resending data to a second tablet terminal 102 can therefore be controlled by the device server 18, and the second tablet terminal 102 to which to send data can be determined with a high degree of freedom.

A transmission buffer 26 is a storage area with a predetermined storage capacity, and stores second data different from the data described above. When the total of the amount of data stored in the transmission buffer 26 and the size of the second data is less than or equal to the capacity of the transmission buffer 26, the communication unit 20*b* adds the second data to the transmission buffer 26, and if the total of the amount of data stored in the transmission buffer 26 and the size of the second data exceeds the capacity of the transmission buffer 26, the second data is stored by overwriting data in the transmission buffer 26. Because data is thus accumulated within the predetermined capacity of the transmission buffer 26, more data can be resent when the second tablet terminal 102 requests retransmission of data.

The second tablet terminal 102 specifies a transmission buffer 26 to request retransmission of data, and the data transmission unit 20*d* sends data stored in the transmission buffer 26 specified by the second tablet terminal 102 from among the transmission buffers 26 linked to the second tablet terminal 102 that requested retransmission of data. As a result, problems resulting from resending unrelated data can be prevented and data can be sent reliably without resending data stored in a transmission buffer 26 not related to the second tablet terminal 102.

When the second tablet terminal 102 and device control unit 20 are connected by WebSocket, and the communication unit 20*b* stores data in one of the transmission buffers 26, the data transmission unit 20*d* can push the stored data to the second tablet terminal 102 linked by the buffer link information 27. As a result, when the communication unit 20*b* stores data in the transmission buffer 26, the data is pushed to the second tablet terminal 102. Data can therefore be transmitted quickly to the second tablet terminal 102, and data can be retransmitted as necessary.

The second browser execution unit 262*a* of the second tablet terminal 102 receives data sent from the device server 18 and displays it on the display panel 102*c*. The second browser execution unit 262*a* displays data received from the device server 18 on the display panel 102*c* in the display format related to the transmission buffer 26 where the data was stored. As a result, the second tablet terminal 102 can determine the display format for displaying the received data based on the transmission buffer 26 from which the data was sent. Data can therefore be transmitted quickly from the device server 18 to the second tablet terminal 102, and the data can be displayed in a specific display format.

The first tablet terminal 101 of the POS system 1 operates as a POS terminal and runs a transaction process, and data based on this transaction process is sent from the host device 11 to the second tablet terminal 102 without the second tablet terminal 102 executing steps to request data from the host device 11. The second tablet terminal 102 to which to send data can be determined based on the relationships to the transmission buffers 26. As a result, the data output to the second tablet terminal 102 and the second tablet terminal 102 to which to output the data can be determined as desired, and the second tablet terminals 102 can be individually controlled.

The second tablet terminal 102 and host device 11 are connected by WebSocket, and the data transmission unit 20*d* generates buffer link information 27 relating a connected second tablet terminal 102 to a transmission buffer 26. As a result, when a second tablet terminal 102 connects by WebSocket to the host device 11, the second tablet terminal 102 is linked to a particular transmission buffer 26 by the buffer link information 27. Therefore, data the host device 11 acquires can be sent to the second tablet terminal 102 after the second tablet terminal 102 connects by WebSocket to the host device 11.

The POS system 1 also has a barcode scanner 12, card reader 13, or other input device that inputs data to the first tablet terminal 101. The data the communication unit 20*b* acquires and stores in the transmission buffer 26 is data input by an input device to the POS terminal, or transaction data resulting from the first tablet terminal 101 processing data input by an input device. As a result, data input by the barcode scanner 12 or card reader 13 to the first tablet terminal 101, or transaction process data resulting from the transaction process executed by the first tablet terminal 101, is sent to the second tablet terminal 102. As a result, the second tablet terminal 102 to which to output the input data or the transaction process data can be determined as desired.

The storage unit 25 includes plural transmission buffers 26, and the data received by the communication unit 20*b* and stored to a transmission buffer 26 may contain information specifying the transmission buffer 26 for storing the data. In this event, the communication unit 20*b* stores the data in the transmission buffer 26 specified by the information contained in the data received from the first browser execution unit 261*a*. In this event, a particular transmission buffer 26 can be specified by the first browser execution unit 261*a*, and the second tablet terminal 102 to which to send the data can be specified.

The data received by the communication unit 20*b* and stored to a transmission buffer 26 may also contain attribute information denoting attributes of the data. In this event, the communication unit 20*b* stores the data in the transmission buffer 26 corresponding to the attributes of the data received from the first browser execution unit 261*a*. In this event, the second tablet terminal 102 to which to send the data that the communication unit 20*b* received can be determined based from the attributes of the data. Data can therefore be sent to the desired output device.

The second browser execution unit 262*a* of the second tablet terminal 102 receives and displays data sent from the device server 18 on the display panel 102*c*. The buffer link information 27 may include information related to the display format for displaying data by the second browser execution unit 262*a*. In this event, the second browser execution unit 262*a* displays data received from the device server 18 based on information related to the display format contained in the buffer link information 27. As a result, data that the device server 18 receives from the first tablet terminal 101 can be displayed by the second tablet terminal 102 in the desired display format.

The second tablet terminal 102 also has location information 112, and may display data from the device server 18 in a display format determined based on the location information 112. In this case, the second tablet terminal 102 can display data in a predetermined display format without the device server 18 specifying the display format.

The invention is described above with reference to a preferred embodiment thereof, but the invention is not limited thereto and can be modified and adapted in many ways without departing from the scope of the accompanying claims.

For example, the foregoing embodiment is described using an example in which the data transmission unit 20*d* pushes data stored in a transmission buffer 26 to a second tablet terminal 102. The invention is not so limited, however, and the output device may be the printer unit 21 or an external printer, for example. More specifically, the data transmission unit 20*d* may push data to the printer unit 21 or another printer, and the printer unit 21 or other printer that receives the data may format and print the data based on previously set information.

A display device may also be connected to the host device 11, and the second tablet terminal 102 may be created virtually on the device control unit 20. More specifically, the CPU of the device control unit 20 may run a software program, and operate as a virtual terminal that runs a web browser identically to the second terminal control unit 262 of the second tablet terminal 102. This virtual terminal may open a second path K2 with the printer unit control unit 20a. In this case, the data transmission unit 20d also sends the data sent to the second tablet terminal 102 to the virtual terminal on the device control unit 20. As a result, data pushed to the second tablet terminal 102 can also be output by the host device 11. The same method can be used to render a virtual terminal that operates identically to the second tablet terminal 102 on the first tablet terminal 101.

The foregoing embodiment is described using an example in which the host device 11 embodies the functions of the POS server 17 and device server 18, but configurations in which the POS server 17 and device server 18 are discrete devices are obviously also possible. Further alternatively, the function of the communication unit 20b and data transmission unit 20d whereby data acquired from the first tablet terminal 101 or an external device is stored in the transmission buffer 26 and pushed to the second tablet terminal 102 may be embodied by the POS server 17. This function may also be performed by a device other than the host device 11.

Yet further, the function blocks shown in FIG. 2 can be desirably achieved by the cooperation of hardware and software, and do not suggest a specific hardware configuration. In addition, the operations can be performed by the devices executing programs stored on an externally connected storage medium.

INDUSTRIAL APPLICABILITY

As described above, the invention is useful for controlling with a high degree of freedom the relationship between sending devices and receiving devices in a system in which data is sent and received between multiple devices, and is particularly useful for sending data without the device on the side receiving the data needing to request data, and when the device to which data should be sent is undefined because the receiving side did not request data.

REFERENCE SIGNS LIST

1 POS system (transmission system)
11 host device
12 barcode scanner (input device)
13 card reader (input device)
17 POS server
18 device server (transmission device, server device)
20 device control unit
20a printer unit control unit
20b communication unit (storage control unit)
20c device communication control unit
20d data transmission unit (transmission control unit, link information control unit)
25 storage unit
26 transmission buffer (storage area, second storage area)
27 buffer link information (link information)
30 POS server control unit
30a application execution unit
31 POS server storage unit
32 server interface (transmission unit)
35 application
101 first tablet terminal (data supply device, POS terminal device)
101c display panel
102 second tablet terminal (reception device, second reception device)
102c display panel (display unit)
112 location information
261 first terminal control unit
261a first browser execution unit
262 second terminal control unit
262a second browser execution unit (output control unit)

The invention claimed is:

1. A point of sale system comprising:
at least one checkout terminal configured to provide a user interface for processing transactions, wherein the at least one checkout terminal is configured to supply first data containing transaction-related information and second data containing transaction-related information;
a plurality of customer terminals, each comprising a display and being configured to display transaction-related information on the display, the plurality of customer terminals including a first customer terminal and a second customer terminal;
a host device comprising:
a server interface configured to communicate with the at least one checkout terminal and the plurality of customer terminals,
a point of sale server, and
a device server configured to communicate with the at least one checkout terminal and the plurality of customer terminals, the device server comprising:
a printer unit,
a printer unit controller configured to generate a command conforming to a command language from received markup language data from the at least one checkout terminal, and to control the printer unit to print a receipt based on the command,
a transmitter,
a storage comprising:
a first transmission buffer configured to store the first data, and
a second transmission buffer configured to store the second data,
wherein the storage is configured to store buffer link information linking the first transmission buffer to the first customer terminal and linking the second transmission buffer to the second customer terminal,
a storage controller configured to control storage of the first data to the first transmission buffer, and to control storage of the second data to the second transmission buffer, and
a transmission controller configured to:
detect that the storage controller stores the first data to the first transmission buffer, and following such detection, control the transmitter to push the first data stored in the first transmission buffer to the first customer terminal linked by the buffer link information by a function of the printer unit controller without a request from the first customer terminal, and
detect that the storage controller stores the second data to the second transmission buffer, and following such detection, control the transmitter to push the second data stored in the second transmission buffer to the device customer terminal linked by the buffer link information by a function of the printer unit controller without a request from the second customer terminal;

wherein at least one of the customer terminals is configured to:
store information setting a location of a display area in the display and information identifying a transmission buffer that is linked to the display area,
generate display data based on the data pushed from the host device, and
dynamically display the display data in the display area based on the information setting the location of the display area in the display and the information identifying the transmission buffer that is linked to the display area.

2. The point of sale system described in claim 1, wherein:
the first data has information specifying the first transmission buffer, and the second data has information specifying the second transmission buffer; and
when controlling storing the first and second data in the respective first and second transmission buffers, the storage controller stores the first and second data in the respective first and second transmission buffers based on the information specifying the respective first and second transmission buffers contained in the first and second data.

3. The point of sale system described in claim 1, wherein:
each of the first and second data has attribute information; and
when controlling storing the first and second data in the respective first and second transmission buffers, the storage controller stores the first and second data in the respective first and second transmission buffers based on the attribute information contained in the first and second data.

4. The point of sale system described in claim 1, wherein:
each of the first and second customer terminals is configured to connect to the device server by Web Socket; and
the device server further comprises a link information controller configured to generate the buffer link information linking the first transmission buffer to the first customer terminal and linking the second transmission buffer to the second customer terminal.

5. The point of sale system described in claim 1, wherein:
the device server is configured such that, when the first customer terminal requests retransmission of the first data after the first data stored in the first transmission buffer of the device server is sent to the first customer terminal, the first data stored in the first transmission buffer is resent to the first customer terminal.

6. The point of sale system described in claim 5, wherein:
the device server is configured such that, when the device server sends the first data stored by the storage controller in the first transmission buffer to the first customer terminal linked to the first transmission buffer by the buffer link information and the first customer terminal then requests retransmission of the first data, the transmission controller controls the transmitter to resend the first data stored in the first transmission buffer linked to the first customer terminal by the buffer link information.

7. The point of sale system described in claim 6, wherein:
each of the first and second customer terminals is configured to connect to the device server by Web Socket; and the transmission controller is configured to control the transmitter to push the data to the first and second customer terminals.

8. The point of sale system described in claim 5, wherein:
the first transmission buffer has a predetermined storage capacity; and
the device server is configured such that, when the device server receives new first data to be stored to the first transmission buffer, and a total amount of the first data and the new first data is less than or equal to the storage capacity of the first transmission buffer, the storage controller stores the new first data to the first transmission buffer in addition to the first data, and
the device server is configured such that, when the device server receives new first data to be stored to the first transmission buffer, and a total amount of the first data and the new first data exceeds the storage capacity of the first transmission buffer, the storage controller stores the new first data to the first transmission buffer by overwriting the first data.

9. A point of sale system comprising:
at least one checkout terminal configured to provide a user interface for processing transactions, wherein the at least one checkout terminal is configured to supply first data containing transaction-related information and second data containing transaction-related information;
a customer terminal comprising a display and being configured to display transaction-related information on the display;
a host device comprising:
a server interface configured to communicate with the at least one checkout terminal and the customer terminal,
a point of sale server, and
a device server comprising:
a printer unit,
a printer unit controller configured to generate a command conforming to a command language from received markup language data from the at least one checkout terminal, and to control the printer unit to print a receipt based on the command,
a transmitter,
a storage comprising:
a first transmission buffer configured to store the first data, and
a second transmission buffer configured to store the second data,
wherein the storage is configured to store buffer link information linking the first transmission buffer to the customer terminal and linking the second transmission buffer to the printer unit,
a storage controller configured to acquire and store the first data in the first transmission buffer and to acquire and store the second data in the second transmission buffer, based on the transaction process of the POS terminal device, and
a transmission controller configured to:
detect that the storage controller stores the first data to the first transmission buffer, and following such detection, control the transmitter to push the first data stored in the first transmission buffer to the customer terminal linked by the buffer link information by a function of the printer unit controller without a request from the customer terminal, and detect that the storage controller stores the second data to the second transmission buffer, and following such detection, control the transmitter to push the second data stored in the second transmission buffer to the printer unit linked by the buffer link information information;

wherein the customer terminal is configured to:
store information setting a location of a display area in the display and information identifying a transmission buffer that is linked to the display area,
generate display data based on the data pushed from the host device, and
dynamically display the display data in the display area based on the information setting the location of the display area in the display and the information identifying the transmission buffer that is linked to the display.

10. The point of sale system described in claim 9, wherein:
each of the customer terminal and the print unit of the host device is configured to connect to the device server by Web Socket; and
the device server further comprises a link information controller configured to generate the buffer link information linking the first transmission buffer to the customer terminal and linking the second transmission buffer to the print unit of the host device.

11. The point of sale system described in claim 9, wherein:
each of the first and second data has attribute information; and
the storage controller is configured such that, when controlling storing the first and second data in the respective first and second transmission buffers, the storage controller stores the first and second data in the respective first and second transmission buffers based on the attribute information contained in the first and second data.

12. The point of sale system described in claim 9, wherein:
the buffer link information includes information related to a display format of the customer terminal; and
the output controller is configured to display the transaction-related information on the display based on the information related to the display format.

13. A host device for use with at least one checkout terminal configured to provide a user interface for processing transactions, wherein the at least one checkout terminal is configured to supply first data containing transaction-related information and second data containing transaction-related information, and a plurality of customer terminals, each comprising a display and being configured to display transaction-related information on the display, the plurality of customer terminals including a first customer terminal and a second customer terminal, the host device comprising:
a server interface configured to communicate with the at least one checkout terminal and the plurality of customer terminals,
a point of sale server, and
a device server configured to communicate with the at least one checkout terminal and the plurality of customer terminals, the device server comprising:
a printer unit,
a printer unit controller configured to generate a command conforming to a command language from received markup language data from the at least one checkout terminal, and to control the printer unit to print a receipt based on the command,
a transmitter,
a storage comprising:
a first transmission buffer configured to store the first data, and
a second transmission buffer configured to store the second data,
wherein the storage is configured to store buffer link information linking the first transmission buffer to the first customer terminal and linking the second transmission buffer to the second customer terminal,
a storage controller configured to control storage of the first data to the first transmission buffer, and to control storage of the second data to the second transmission buffer, and
a transmission controller configured to:
detect that the storage controller stores the first data to the first transmission buffer, and following such detection, control the transmitter to push the first data stored in the first transmission buffer to the first customer terminal linked by the buffer link information by a function of the printer unit controller without a request from the first customer terminal, and
detect that the storage controller stores the second data to the second transmission buffer, and following such detection, control the transmitter to push the second data stored in the second transmission buffer to the second customer terminal linked by the buffer link information by a function of the printer unit controller without a request from the second customer terminal.

14. The device server described in claim 13, wherein:
the device server is configured such that, when the first customer terminal requests retransmission of the first data after the first data stored in the first transmission buffer of the device server is sent to the first customer terminal, the first data stored in the first transmission buffer is resent to the first customer terminal.

15. A data transmission method, comprising:
providing at least one checkout terminal configured to provide a user interface for processing transactions, wherein the at least one checkout terminal is configured to supply first data containing transaction-related information and second data containing transaction-related information;
providing a plurality of customer terminals, each comprising a display and being configured to display transaction-related information on the display, the plurality of customer terminals including a first customer terminal and a second customer terminal;
providing a host device comprising:
a server interface configured to communicate with the at least one checkout terminal and the plurality of customer terminals,
a point of sale server, and
a device server configured to communicate with the at least one checkout terminal and the plurality of customer terminals, the device server comprising:
a printer unit,
a printer unit controller configured to generate a command conforming to a command language from received markup language data from the at least one checkout terminal, and to control the printer unit to print a receipt based on the command, a transmitter, and a storage comprising:
- a first transmission buffer configured to store the first data, and
- a second transmission buffer configured to store the second data,
- wherein the storage is configured to store buffer link information linking the first transmission buffer to a first customer terminal and linking the second transmission buffer to a second customer terminal;

acquiring data including information specifying the first transmission buffer or the second transmission buffer;

detecting that the acquired data specifies the first transmission buffer, and following such detection, storing the acquired data in the first transmission buffer as the first data, and controlling the transmitter to push the first data stored in the first transmission buffer to the first customer terminal linked by the buffer link information by a function of the printer unit controller without a request from the first customer terminal;

detecting that the acquired data specifies the second transmission buffer, and following such detection, storing the acquired data in the second transmission buffer as the second data, and controlling the transmitter to push the second data stored in the second transmission buffer to the second customer terminal linked by the buffer link information by a function of the printer unit controller without a request from the second customer terminal; and using at least one of the customer terminals:
- storing information setting a location of a display area in the display and information identifying a transmission buffer that is linked to the display area,
- generating display data based on the data pushed from the host device, and
- dynamically displaying the display data in the display area based on the information setting the location of the display area in the display and the information identifying the transmission buffer that is linked to the display area.

16. The data transmission method described in claim 15, further comprising:
receiving a request for retransmission of the first data from the first customer terminal after the first data stored in the first transmission buffer is sent to the first customer terminal, and resending the first data stored in the first transmission buffer to the first customer terminal.

17. The point of sale system described in claim 1, wherein the transmission controller is configured to create and delete the first and second transmission buffers.

18. The point of sale system described in claim 9, wherein the transmission controller is configured to create and delete the first and second transmission buffers.

19. The transmission device host device described in claim 13, wherein the transmission controller is configured to create and delete the first and second transmission buffers.

20. The data transmission method described in claim 15, wherein:
the step of providing the host device comprises creating the first and second transmission buffers in the storage, and
the method further comprises, after the steps of controlling the transmitter to send the first data stored in the first transmission buffer to the first customer terminal linked by the buffer link information and controlling the transmitter to send the second data stored in the second transmission buffer to the second customer terminal linked by the buffer link information, deleting the first and second transmission buffers from the storage.

* * * * *